May 14, 1963 J. I. DAVIS ETAL 3,089,557
APPARATUS FOR GROUND HANDLING OF HEAVY AIRCRAFT
Filed May 11, 1960 14 Sheets-Sheet 1

INVENTORS
JEROME I. DAVIS
BY RAYMOND J. ENYEART
JOHN E. STENBACK
Krazinski & Nolan
ATTORNEYS May 14, 1963 J. I. DAVIS ETAL 3,089,557
APPARATUS FOR GROUND HANDLING OF HEAVY AIRCRAFT
Filed May 11, 1960 14 Sheets-Sheet 2
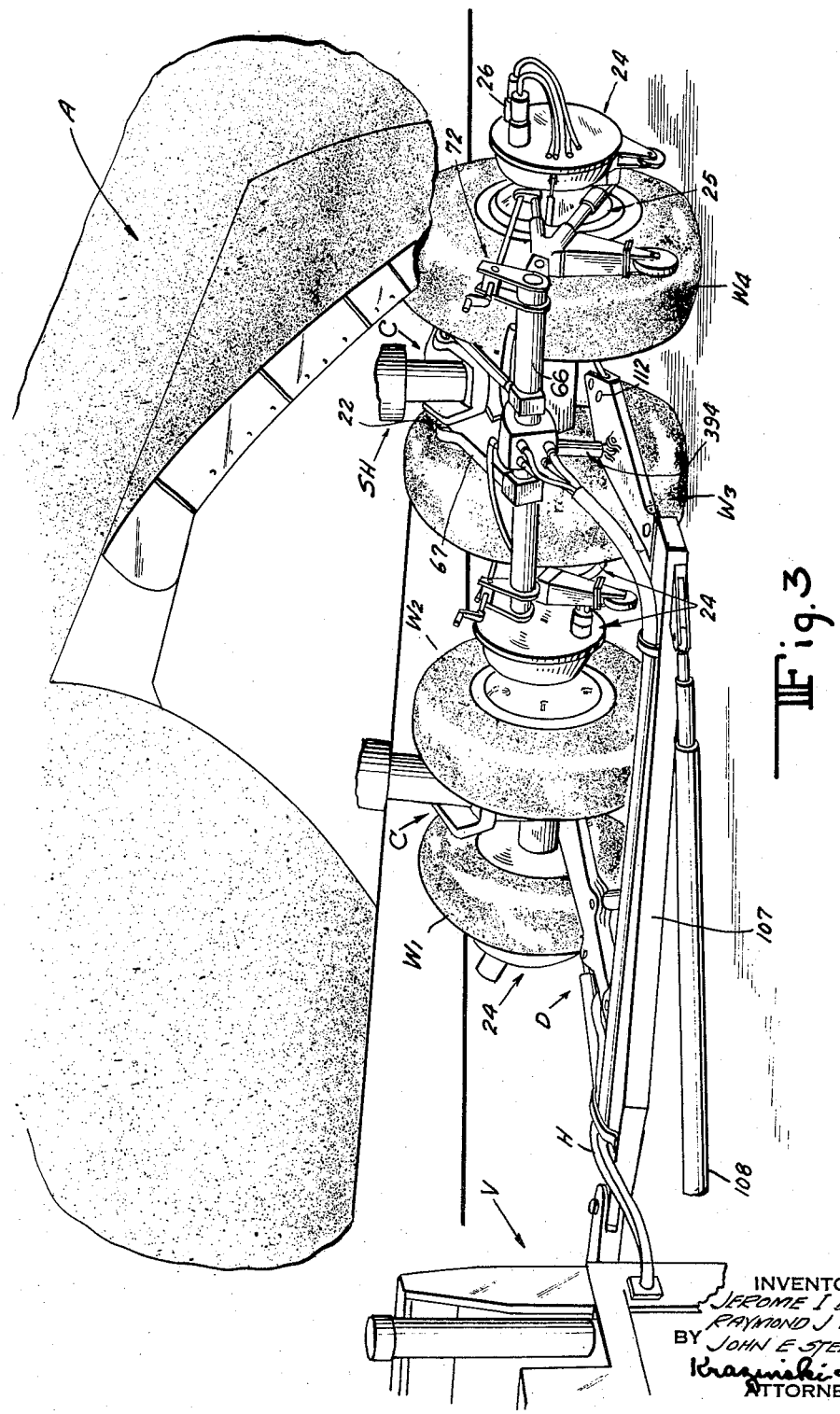
INVENTORS
JEROME I DAVIS
RAYMOND J ENYEART
BY JOHN E STEINBACK
Krazinski & Nolan
ATTORNEYS

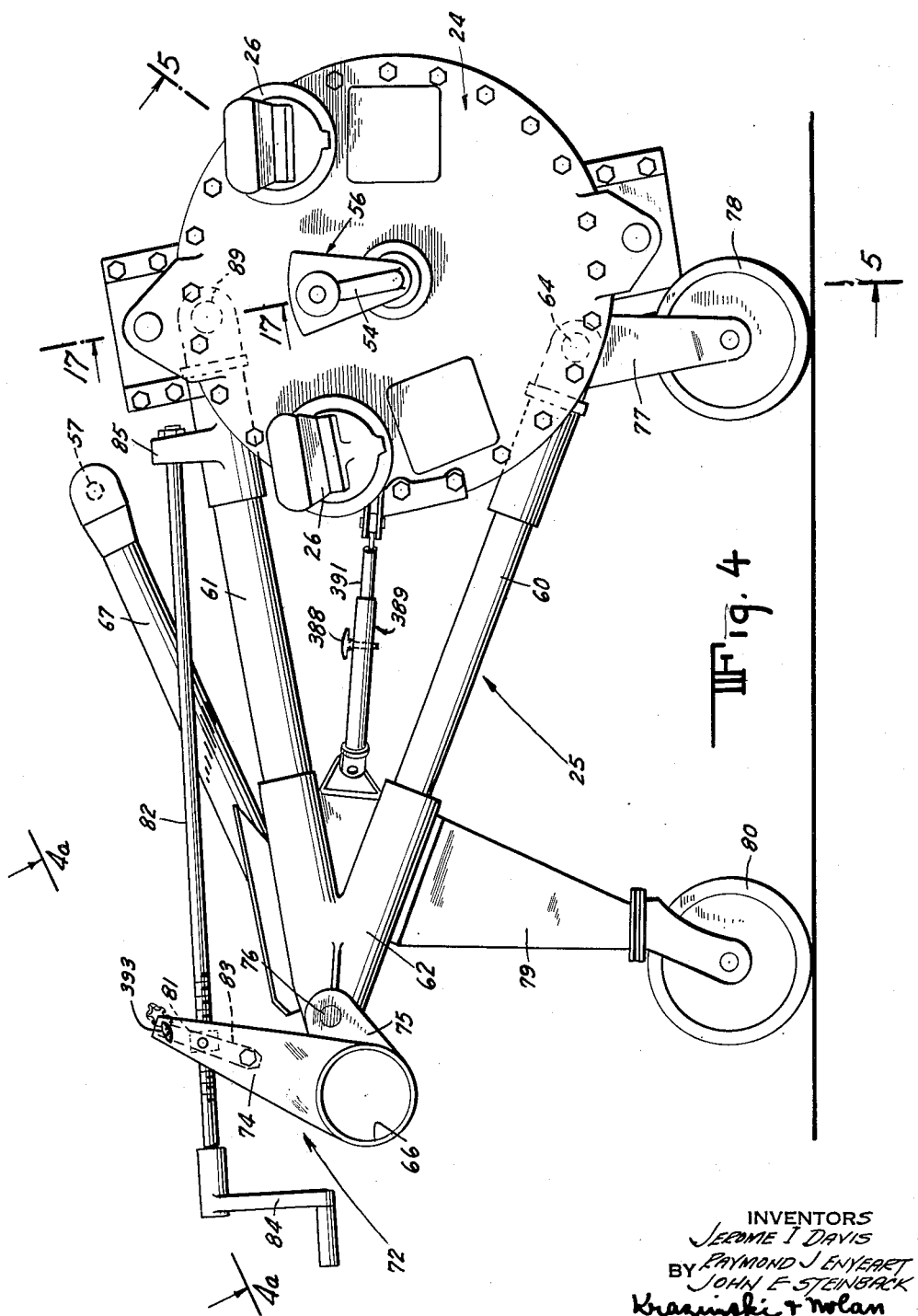

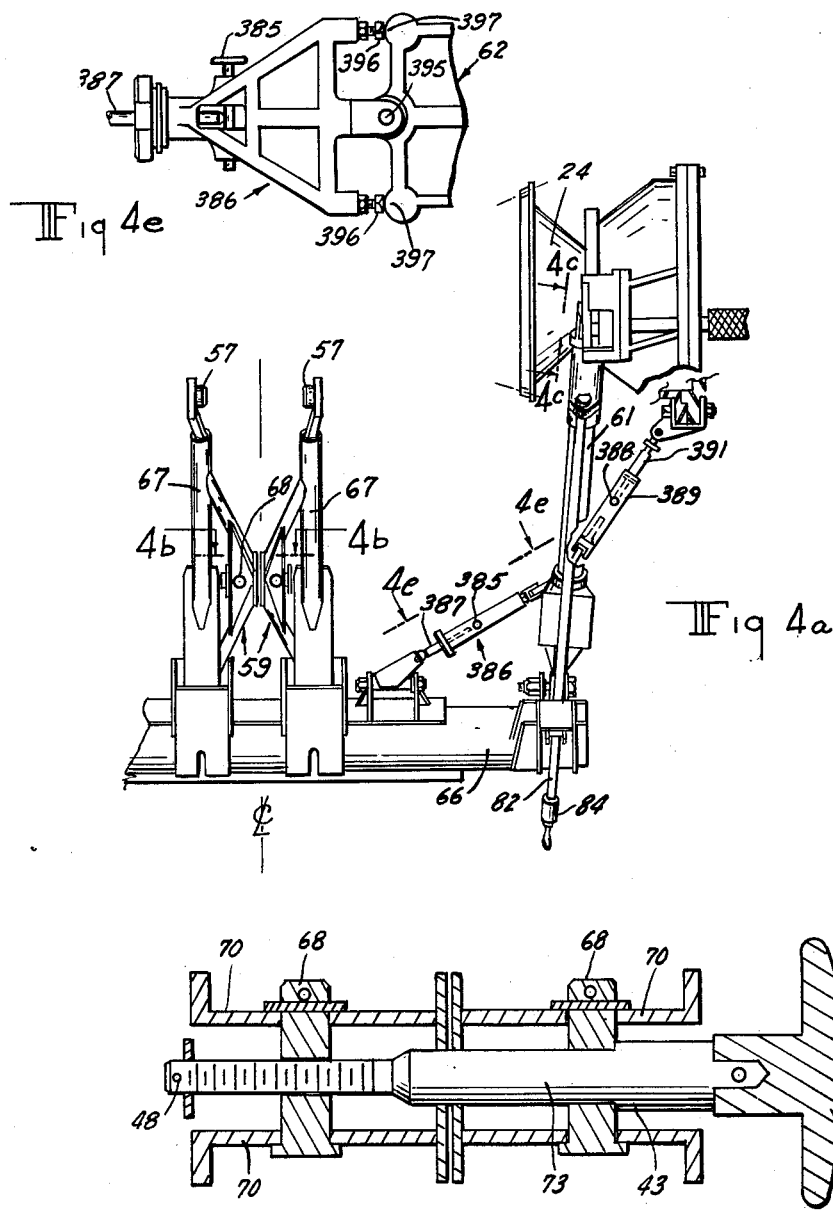

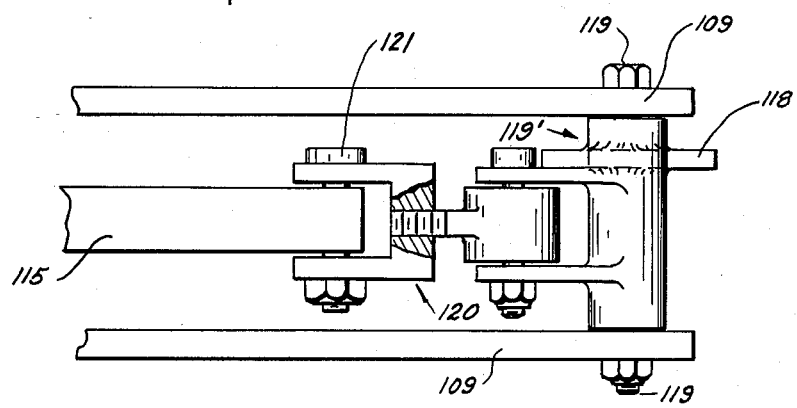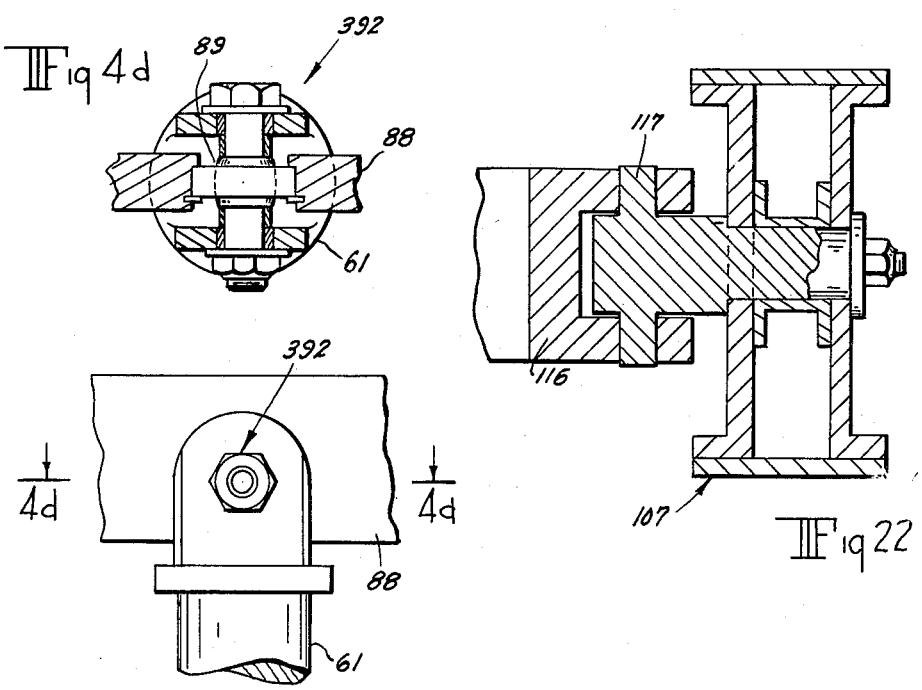

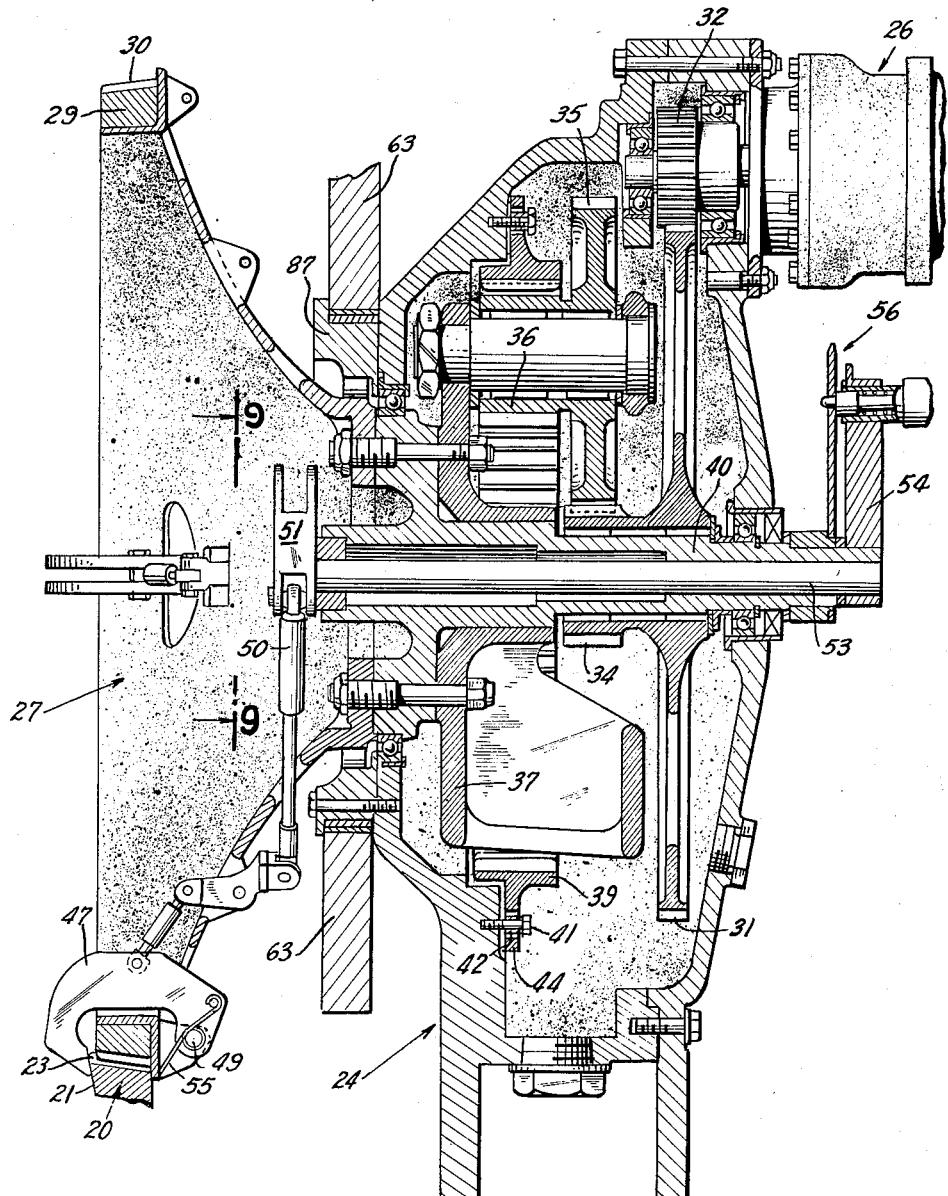

May 14, 1963 J. I. DAVIS ETAL 3,089,557
APPARATUS FOR GROUND HANDLING OF HEAVY AIRCRAFT
Filed May 11, 1960 14 Sheets-Sheet 7

INVENTORS
JEROME I DAVIS
RAYMOND J ENYEART
BY JOHN E STEINBACK
Krayniski & Nolan
ATTORNEYS May 14, 1963  J. I. DAVIS ETAL  3,089,557
APPARATUS FOR GROUND HANDLING OF HEAVY AIRCRAFT
Filed May 11, 1960  14 Sheets-Sheet 8

INVENTORS
JEROME I. DAVIS
RAYMOND J. ENYEART
BY JOHN E. STEINBACK
Kraguski + Nolan
ATTORNEYS May 14, 1963 J. I. DAVIS ETAL 3,089,557
APPARATUS FOR GROUND HANDLING OF HEAVY AIRCRAFT
Filed May 11, 1960 14 Sheets-Sheet 9
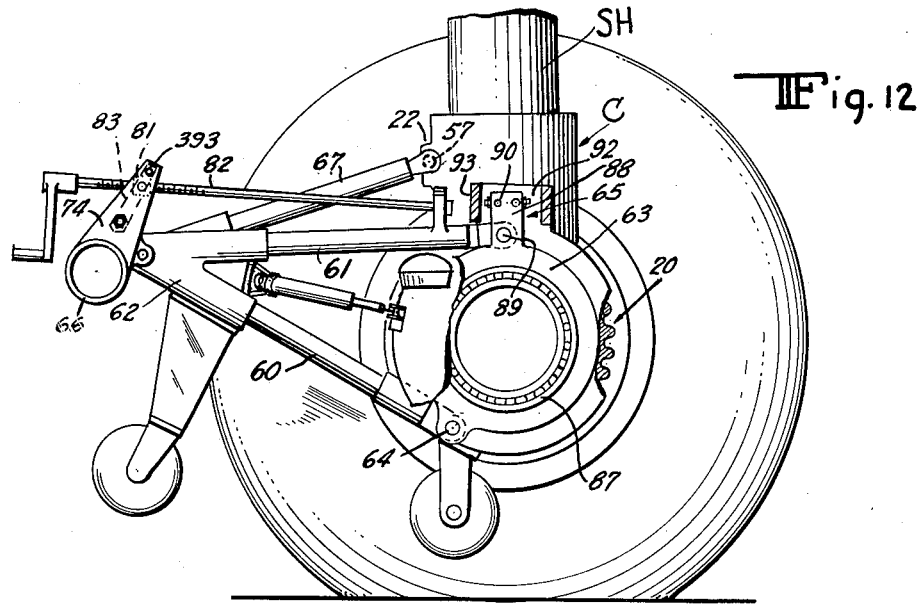
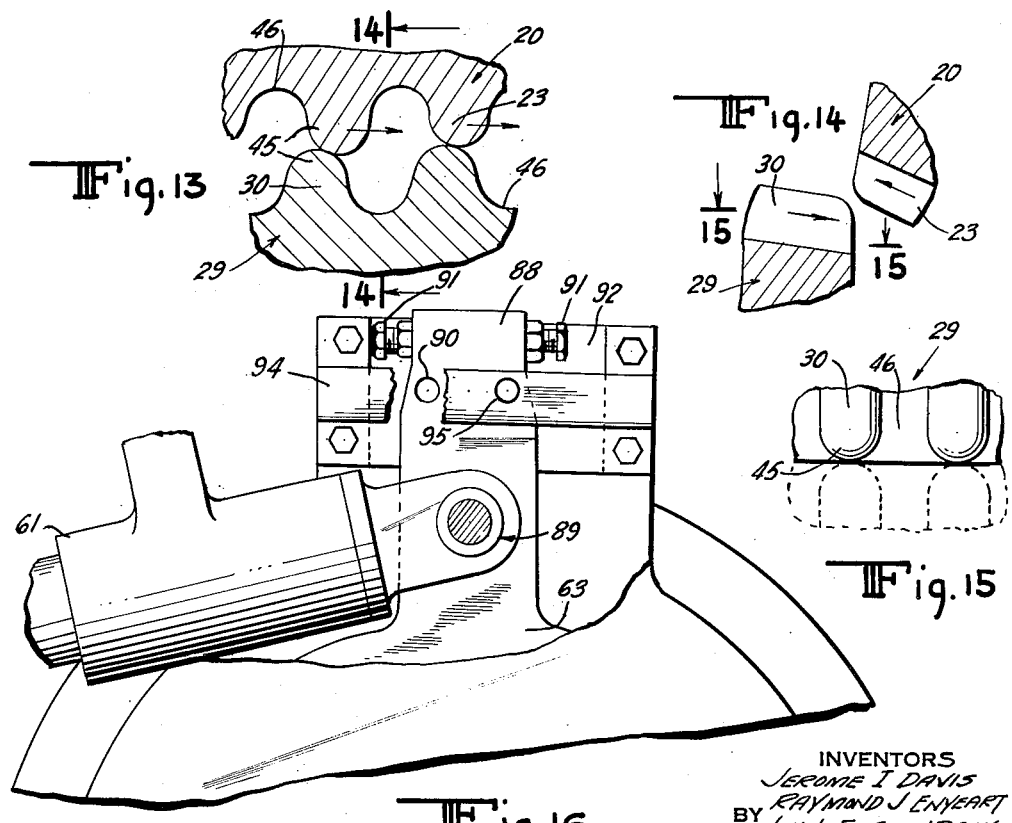
INVENTORS
JEROME I DAVIS
RAYMOND J ENYEART
BY JOHN E STEINBACK
Krazinski + Nolan
ATTORNEYS

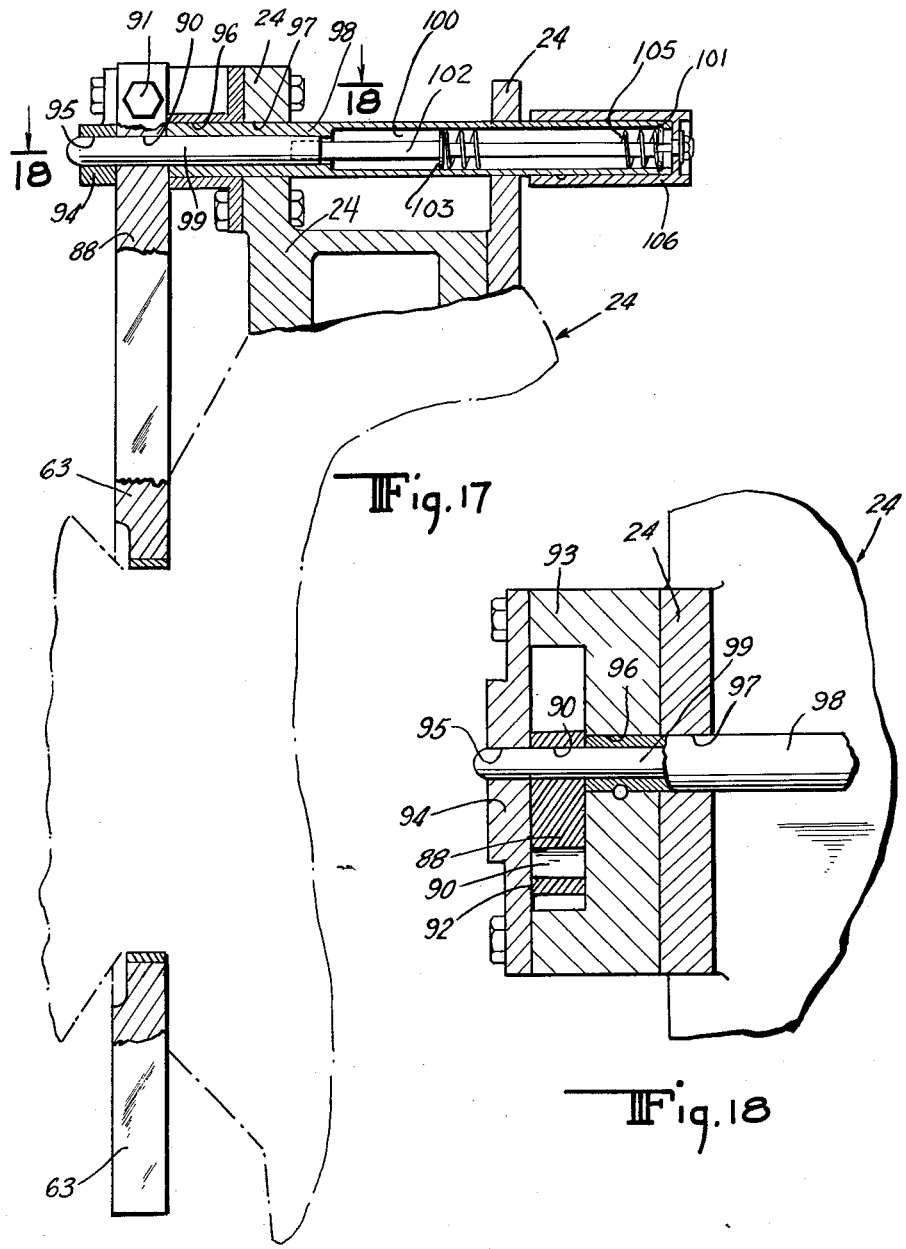

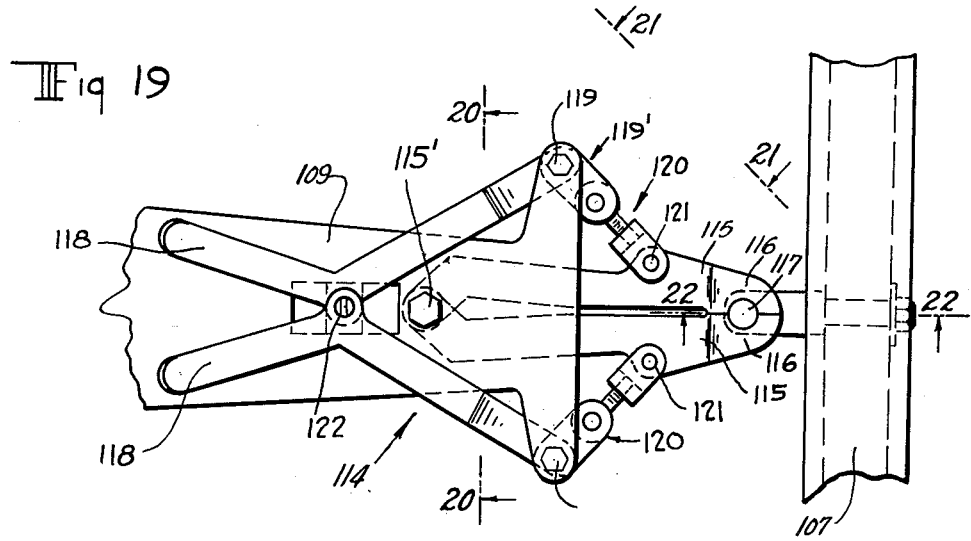
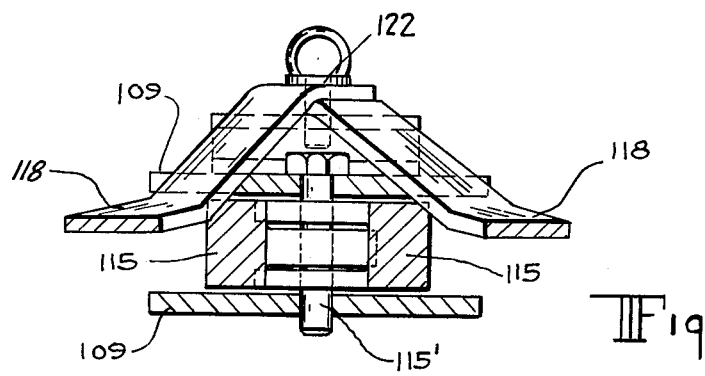

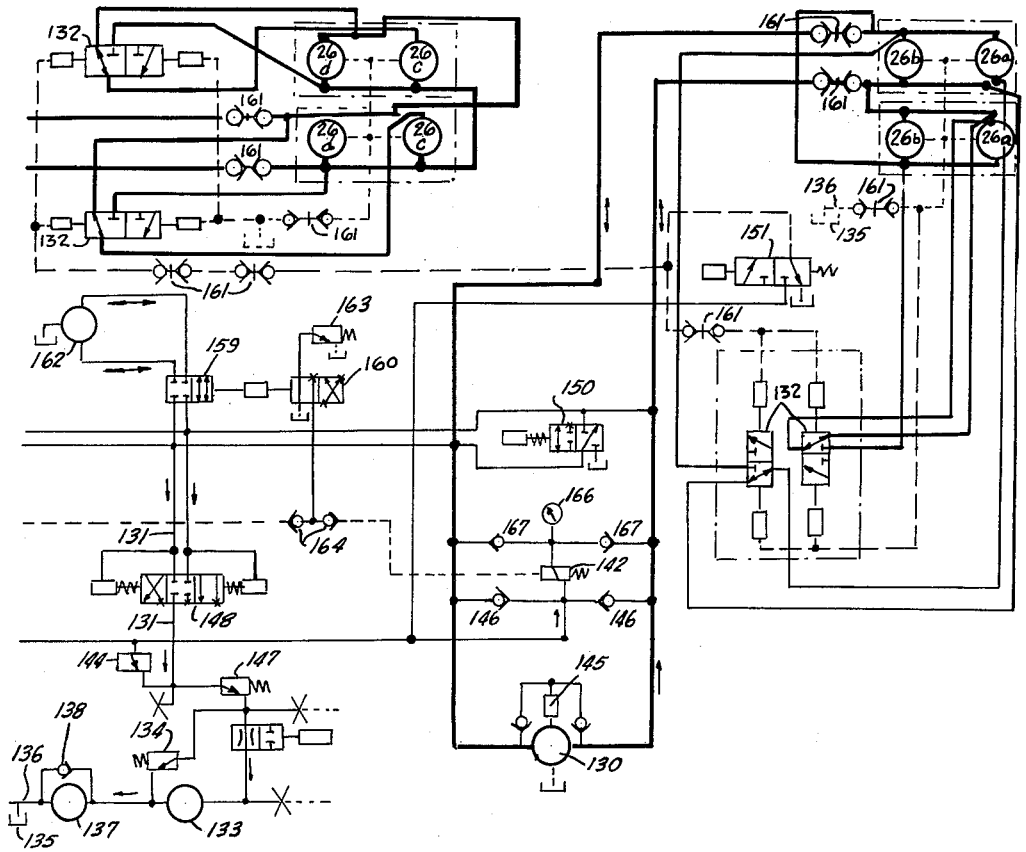
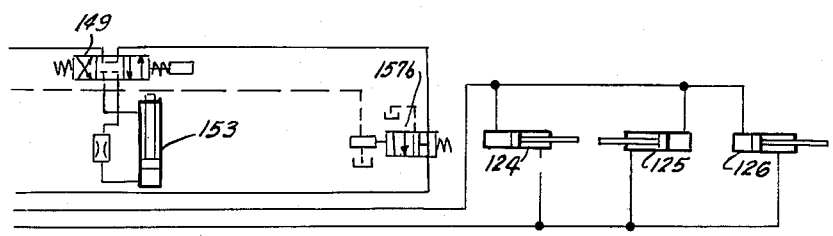
Fig. 23a
INVENTORS
JEROME I DAVIS
RAYMOND J ENYEART
BY JOHN E STEINBACK
Krasinski + Nolan
ATTORNEYS INVENTORS
JEROME I DAVIS
RAYMOND J ENYEART
BY JOHN E STEINBACK
Krazynski + Nolan
ATTORNEYS

United States Patent Office 3,089,557
Patented May 14, 1963

3,089,557
APPARATUS FOR GROUND HANDLING
OF HEAVY AIRCRAFT
Jerome I. Davis, Bedford, N.Y., and John E. Steinback, Windsor, and Raymond J. Enyeart, Westport, Conn., assignors to Consolidated Diesel Electric Corporation, Stamford, Conn., a corporation of New York
Filed May 11, 1960, Ser. No. 28,308
25 Claims. (Cl. 180—14)

The present invention relates to apparatus for ground handling of heavy aircraft and, more particularly, to improved apparatus which powers the wheels of the aircraft while on the ground.

It is required that a ground power unit be able to propropel aircraft at a speed up to five miles per hour with acceleration on the order of one foot per second, successfully negotiate a two percent grade without serious loss in forward velocity, and move the aircraft on a snow-covered ramp or under other adverse conditions of traction when the coefficient of friction between the aircraft tires and the ramp or the ground is as low as 0.2 or even 0.1.

In co-pending application for Letters Patent of the United States Serial No. 812,261, filed May 11, 1959, which matured into Patent No. 2,993,549 on July 25, 1961 and which was assigned to the assignee of this application, there is disclosed wheel mover apparatus adapted to be coupled and uncoupled with respect to the main landing wheels of the aircraft. Such apparatus has been used successfully in moving aircraft on the ground weighing up to about 250,000 pounds but has been found inadequate for effectively moving bomber and tanker aircraft and the like weighing about 500,000 pounds.

Accordingly, an object of the present invention is to provide apparatus of the type disclosed in the aforementioned patent application which is capable of meeting all the prescribed requirements in moving the heavier aircraft while on the ground.

Another object is to provide such apparatus which has all the advantages of the prior apparatus mentioned herein but embodies improvements which make it more powerful, some of such advantages being that the wheel movers are readily coupled and uncoupled, that the wheel movers do not impose any material weight penalty to the aircraft, and that the wheel movers can be fitted on the aircraft with little modification of the aircraft.

Another object is to provide such apparatus which, while heavier, is arranged to enable the same to be handled manually.

A further object is to accomplish the foregoing in a simple, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is a fragmentary perspective view of the aircraft illustrating the wheel mover units attached to the wheels of the aircraft main landing gear.

FIG. 4 is a side elevational view of a wheel mover unit.

FIG. 4a is a sectional view taken along the line 4a—4a on FIG. 4 of elements for attaching the wheel movers to aircraft structure.

FIG. 4b is a sectional view taken along the line 4b—4b on FIG. 4a.

FIG. 4c is a sectional view taken along the line 4c—4c on FIG. 4a.

FIG. 4d is a sectional view taken along the line 4d—4d on FIG. 4c.

FIG. 4e is a sectional view taken along the line 4e—4e on FIG. 4a.

FIG. 5 is a sectional view taken along the line 5—5 on FIG. 4.

FIGS. 10, 11 and 12 are diagrammatic side elevational views illustrating the manner of coupling a wheel mover unit onto an aircraft wheel.

FIG. 13 is a fragmentary sectional view of the teeth of the wheel and wheel mover gears as being meshed.

FIG. 14 is a sectional view taken along the line 14—14 on FIG. 13.

FIG. 15 is a sectional view taken along the line 15—15 on FIG. 14.

FIG. 16 is an enlarged fragmentary side elevational view illustrating details of the wheel mover coupling mechanism in the position shown in FIG. 12, except for the opposite wheel mover unit.

FIG. 17 is a sectional view taken along the line 17—17 on FIG. 4 illustrating the indexing mechanism for meshing the teeth of the driving and driven rings.

FIG. 18 is a sectional view taken substantially along the line 18—18 on FIG. 17.

FIG. 19 is a plan view of linkage for attaching the satelliting beam to aircraft structure.

FIGS. 20, 21, 22 are sectional views taken along the lines 20—20, 21—21, and 22—22, respectively, on FIG. 19.

FIGS. 23 and 23a are diagrammatic views which, taken together, illustrate a hydraulic system for powering the wheel mover units.

General Description

Figure 1:
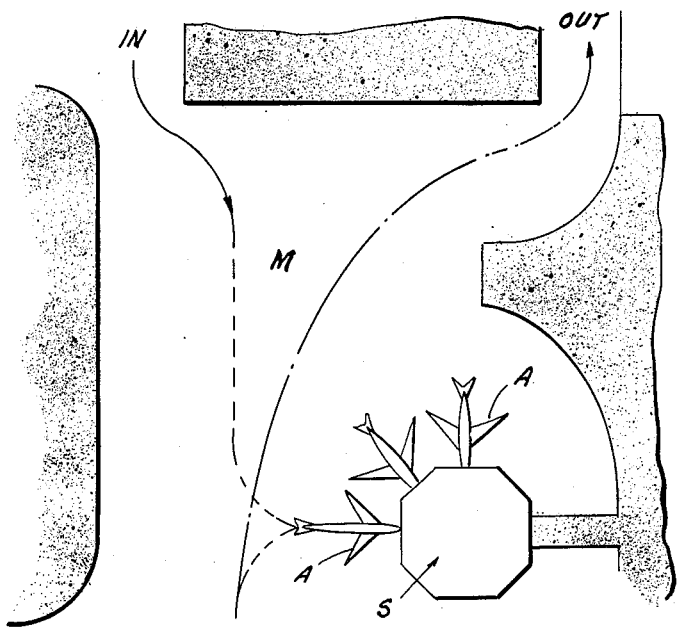
FIG. 1 is a schematic plan view of an airport loading and unloading area, illustrating the paths in which the aircraft is moved.

Referring to the drawings in detail, an area of the airport is shown in FIG. 1 which includes an entrance marked "In," an exit marked "Out," a station S, aircraft A at the station, and a maneuvering space M between the station and the entrance and exit.

The path of the aircraft is shown in broken lines on its way to the station. The aircraft is moved forward and makes several turns and, on its way from the station, the aircraft is backed out and moved forward to the exit while again making several turns. The wheel moving system and apparatus in accordance with the present invention, about to be described in detail, is particularly adapted to move aircraft weighing about 500,000 pounds in this manner and to execute more complicated maneuvers if called upon even when the ground and ramps are slippery.

Figure 2:
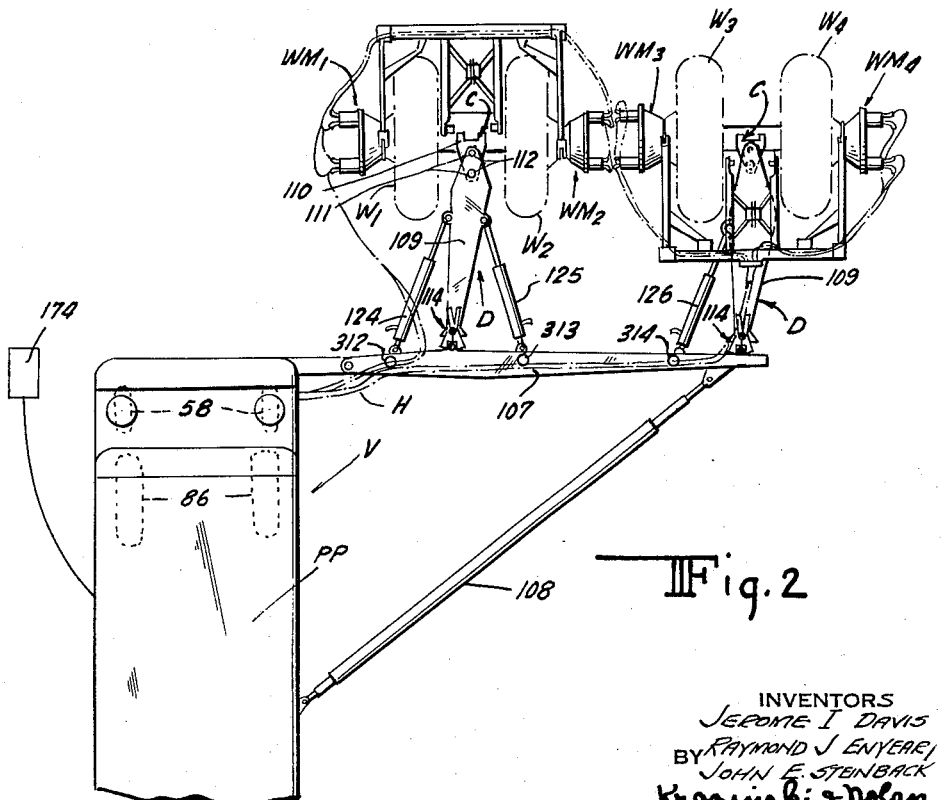
FIG. 2 is a plan view of the apparatus in accordance with the present invention including the wheel mover units and a portion of a mobile vehicle which carries the wheel mover units and a power plant for powering the units.

In FIGS. 2 and 3, such heavy aircraft is shown having main landing gear which includes two sets of pairs of wheels W1, W2, W3 and W4, all in axial alignment. Each set of wheels (W1—W2 and W3—W4) has independent supporting structure including a carriage C and a shock absorbing member SH for attachment to the aircraft. A power plant PP is mounted on a vehicle V which is equipped with two sets of pairs of wheel movers WM1, WM2, WM3 and WM4 adapted to be coupled to the corresponding numbered wheels at the remotely opposite sides of each set of wheels. To accomplish this, the wheels and wheel movers are provided with cooperating means for placing them in driving connection, as will be described in detail hereinafter.

As in the system disclosed in the aforementioned patent application, the wheel movers preferably are driven by hydraulic motors which are supplied with hydraulic power by hoses H connected to the power plant.

The vehicle is coupled to the aircraft by satelliting linkage D (FIGS. 2 and 3) which will be described hereinafter.

The Wheel Movers in General

The two sets of wheel movers (WM1—WM2 and WM3—WM4) are identical in construction but, as shown in FIGS. 2 and 3, the set nearest the vehicle V is supported by structure in front of the wheels W1—W2 to facilitate coupling the wheel movers to the landing gear carriage C, whereas the other set of wheel movers is supported by structure in back of the wheels W3—W4. Also, each wheel mover, as shown in FIGS. 4 to 18, is identical in construction and operation.

Generally described, the wheel movers comprise a casing adapted for attachment to an aircraft wheel to be driven and connecting structure for a pair of casings, such as a frame composed of arms and adapted for attachment to the landing gear carriage to provide a torque reaction point connection to the casings. The casing includes motor means, a gear train, a drive ring adapted to mesh with a mating ring on the aircraft wheel to be driven, an arrangement for putting the rings in mesh, and clamping mechanism for coupling and uncoupling the casing to the aircraft wheels.

The Aircraft Structure

As shown in FIGS. 5, 6, 12, 13 and 14, each aircraft wheel is provided with a recessed, serrated ring 20 on its face having radially inwardly facing teeth 23 adapted to receive the teeth of the driving ring of the wheel mover and forming an inner edge 21 for receiving the clamping mechanism. Each carriage structure C provides a pair of aircraft wheels and is connected to the shock absorbing member SH which is formed with a pair of spaced, apertured lugs 22 for removably securing arms of the frame to provide torque reaction points (FIGS. 3, 10, 11 and 12).

The rings 20 represent the only change which must be made in the design of the aircraft, and this change is of a minor nature and is readily feasible. Also, the rings are so light in weight that the slight weight increase of several pounds is tolerable on multi-ton aircraft, particularly in view of the advantages to be gained at so slight a weight penalty.

The Wheel Movers

As shown in FIGS. 4, 5, 6, 7 and 8, the wheel movers, as already indicated, comprise a casing 24 housing the gear train for driving the wheel to be driven, and torque reaction frame structure 25 which will be described in detail hereinafter.

Generally described, the wheel mover gear train is driven by either one or two reversible hydraulic motors 26 mounted on the casing 24, two being preferred as shown, and the gear train in turn rotates a casing 27 (FIG. 5) which carries a serrated ring 29 having teeth 30 adapted to mesh with the teeth 23 of the aircraft wheel ring 20.

In order to facilitate meshing of the teeth 23 and 30 when the ring 29 is inserted into the ring 20, the teeth are tapered in an axial direction, with the teeth 23 diverging and the teeth 30 converging (FIGS. 13 to 15); and the teeth 23 and 30 have rounded crowns 45 and recesses 46 to enable the rings 20 and 29 to cam into mesh.

Figure 6:
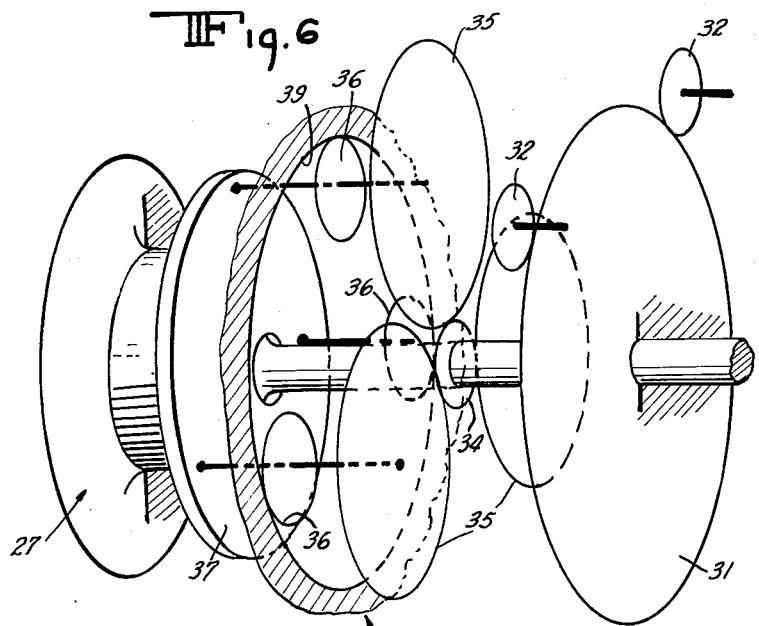
FIG. 6 is a diagrammatic view of the gearing for the wheel mover unit.

As best shown in FIGS. 5 and 6, the gear train comprises a gear 31 which is driven by gears 32 on each motor drive shaft and which carries a reducing sun gear 34, and three sets each of planet gears 35 and 36 connected for rotation with each other and mounted on a planet carrier 37 for rotating the casing 27, with the planet gears 35 in mesh engagement with the sun gear 34 and the planet gears 36 in mesh engagement with a ring gear 39 mounted within the casing 24, as described hereinafter.

In order to mount the gears 31, 34 and the planet carrier 37 a central sleeve or drive shaft 40 extends through and is journalled for rotation in the casing 24 (FIG. 5). The gears 31 and 34 are freely rotatable on the drive shaft 40, whereas the planet carrier 37 is rigidly secured to the drive shaft 40 to be rotated thereby.

The ring gear 39 is in floating connection with the casing 24 to provide tolerances in all directions for variations in concentricity and alignment.

Figure 7:
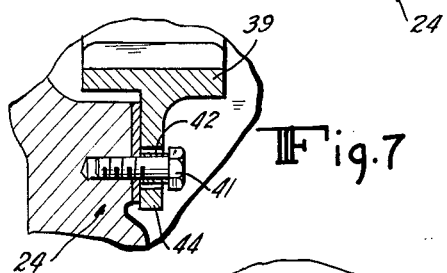
FIG. 7 is an enlarged fragmentary sectional view of a floating gear connection shown in FIG. 5.
Figure 8:
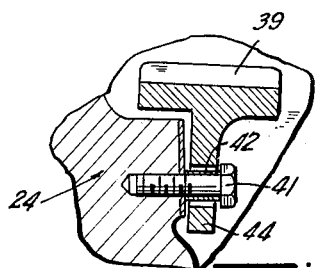
FIG. 8 is a view similar to FIG. 7 illustrating the manner in which the gear can move.

This floating connection is shown by bolts 41 which extend through oversize holes 42 in a flange 44 on the gear 39 and are threaded into the casing 24 (FIGS. 5, 7 and 8).

The Wheel Clamping Mechanism

Figure 9:
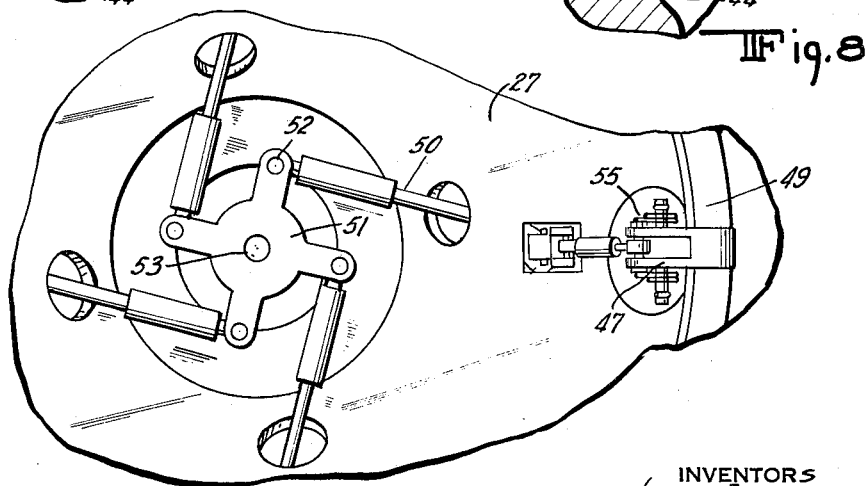
FIG. 9 is a sectional view taken along the line 9—9 on FIG. 5.

As best shown in FIGS. 5 and 9, the clamping mechanism comprises several independently spring biased C-clamp members 47 for engaging the inner edge 21 of the ring 20, pins 49 for pivotally mounting the clamp members 47 on the casing 27, linkage 50 for rocking the clamps, a plate 51 having lugs 52 to which the linkage 50 is also connected for movement thereof, a shaft 53 mounted for rotation in the sleeve 40 and secured to the plate 51 to rotate the same, a handle 54 for rotating the shaft 53, springs 55 for urging the clamps to grip the inner edge 21 of the aircraft wheel ring 20 and an arrangement 56 for locking the handle in at least three positions, namely, with the clamps drawn in radially to fit into the ring 20, extended radially outwardly so that the jaws of the clamps overlie the inner edge 21 and drawn outwardly with respect to the wheel, so that the jaws grip the inner edge 21.

Such an arrangement is illustrated and described in the aforementioned patent application and, since the arrangement utilized herein does not constitute part of the present invention, detailed illustration and description thereof appears not to be required.

The Torque Reaction Frame

As best shown in FIGS. 3, 4, 10 to 12, and 16 to 18, the torque reaction frame includes two pairs of arms 60 and 61, one pair for each pair of wheel movers, which arms are interconnected at one end by a V-shaped fitting 62. The other end of each arm 60 is connected by a conventional self-aligning pivot 64 to an annular member 63 (FIG. 12) and the other end of each arm 61 is secured to the member 63 by an adjustable or indexing connection 65 (FIG. 12), to be described hereinafter (FIGS. 16–18), which connection enables the casing 24 to be rotated in either direction for a distance equivalent to at least one-half of a tooth of the serrated rings 20 and 29.

Figure 10:
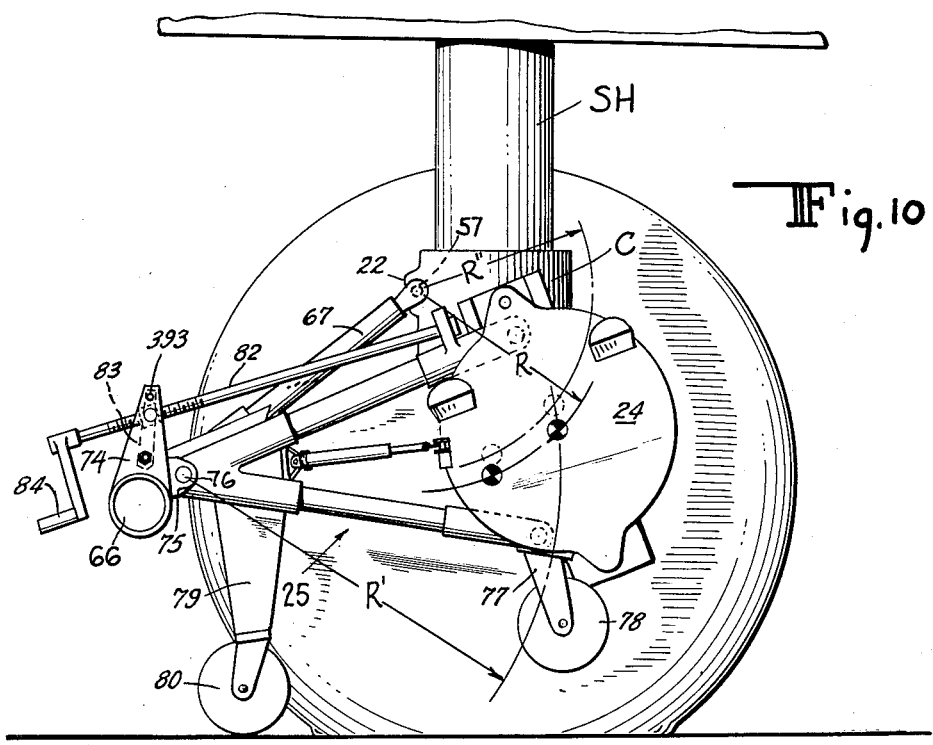

As shown in FIGS. 4, 4a and 4b, a cross bar or tube 66 for each pair of wheels has one end of a pair of spaced links 67 pivotally mounted thereon and the other end of each link 67 has a pin 57 thereon with the pins facing each other for reception by openings (not shown) in lugs 22 of the aircraft wheel supporting structure (FIG. 10).

In order to facilitate pivotal movement of the links 67 so that the pins 57 can be moved into and out of the openings in lugs 22 and to lock the pins 57 within the openings while the aircraft is being moved, each link 67 has a V-shaped frame 59 (FIG. 4a) facing the other and is provided with means for releasably securing the same. Such releasable means (FIG. 4b) may comprise a pair of pins 68 mounted by plates 70 on the frames 59, one of the pins having a transverse threaded bore and the other pin having a transverse smooth bore, both bores being in alignment, and a bolt 73 threaded into the threaded bore and slidably disposed in the smooth bore having a handle 38 at one end for rotating the same, a shoulder 43 for abutting the pin formed with the smooth bore and a cross pin 48 at the other end for preventing the bolt from being withdrawn from the threaded bore.

Thus before connecting the wheel mover to the aircraft, the bolt 73 is turned outwardly to enable the links 67 to be swung apart, so that the pins 57 can enter the openings in lugs 22 upon moving the links 67 toward each other when the pins 57 are in registry with the openings. After the pins 57 have been so inserted into the openings, the bolt 73 is turned inwardly to hold the frames 59 against lateral movement.

A lever 72 (FIG. 4) is rigidly mounted on the cross-bar 66 adjacent each end thereof, which levers include an upper arm 74 and a lower arm 75 pivotally linked by a conventional self-aligning bushing 76 to the V-fitting 62.

In order to facilitate moving the wheel mover unit for a pair of wheels into position to attach the wheel movers to the two wheels and to facilitate removing the unit, each wheel mover casing 24 has a leg 77 at its lower portion with a roller 78 thereon and each V-fitting 62 has a leg 79 with a castering roller 80 thereon, to thereby provide a four point roller support for both casings of the unit on the ground (FIG. 4).

Figure 11:
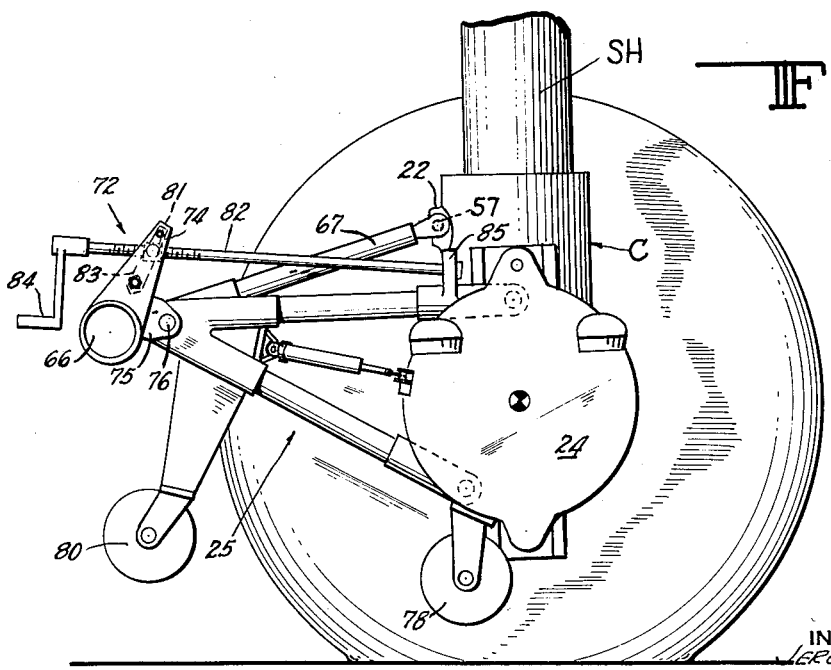

In FIG. 10, a wheel mover is shown after it has been attached by pins 57 to the lugs 22 of the aircraft carriage C and after the casing 24 has been raised from the ground by crank 84. When the casing 24 is so positioned, the center of the ring 29 on the ring casing 27 is not in axial alignment with the center of the ring 20 on the aircraft wheel. However, the linkage between the casing 24 and the cross-bar 66, and between the cross-bar 66 and the pivotal connection to the aircraft carriage at 57 is so constructed and arranged that the centers of both rings 20 and 29 can be disposed in an arc defined by a radius having its center at the pivotal connection 57 of the link 67 to the aircraft. Thus, by moving the center of the ring 29 through this arc in a clockwise direction as viewed, that is, by raising the frame 25 to lift the wheel 80 off the ground, the ring centers can be brought into alignment (FIG. 11).

In order to facilitate so aligning the centers of the rings 20 and 29 and to retain the casing 24 and the frame 25 in such position, the upper lever arm 74 (FIG. 4) carries a conventional self-aligning nut 81, and a threaded rod 82 extends through the nut, which nut 81 is also carried by an arm 83 pivotally mounted at its lower end on the arm 74. The rod 82 has a crank handle 84 at one end and has its other end journalled for rotation in a bearing block 85 on the arm 61 adjacent the wheel mover casing 24. Thus as shown in FIGS. 10 and 11, when the handle 84 is turned to rotate the rod 82, the threaded rod and the nut 81 provide a lifting moment about the pivotal bushing 76 to raise the V-fitting 62 including the arms 60 and 61 and thereby lift the roller 78 off the ground. As this occurs, the center of the ring 29 is brought into alignment with the center of the ring 20 (FIG. 11).

Since the aircraft wheel may be stopped with its ring 20 in a position in which its teeth fail to mesh with the teeth of the wheel mover ring 29, provision is made by the indexing connection 65 for rotating the casing 24 and the ring 29 thereon about the width of one-half a gear tooth in either direction to enable the teeth thereof to be brought into mesh with the teeth of the ring 20.

As shown in FIGS. 12 and 16 to 18, such an indexing connection 65 comprises the annular member 63 which is journalled about the outer periphery of a ring 87, rigidly secured to the casing 24 (FIG. 5). The annular member 63 includes an extension 88 which is connected by a conventional self-aligning bushing 89 (FIGS. 4d, 16) to the outer end of the arm 61. Thus the outer ends of both arms 60, 61 are connected at 64 and 89, respectively, to the annular member 63. The extension 88 adjacent its upper end is shown provided with two spaced openings 90, the purpose of which will be described hereinafter, with an adjustable protuberance or stop 91 at each side thereof. The casing 24 with ring 29 is thus enabled to move a limited distance within a recess 92 (FIG. 12) formed within a member 93 having a back wall 94 (FIG. 16) with an opening 95 therethrough. The member 93 with its back wall 94 is rigidly secured to the casing 24 (FIG. 17) and is provided with an opening 96 that registers with openings 95 and 97 of the back wall 94 and casing 24, respectively. The openings 90 and 95 are of identical diameter but are of smaller diameter than the same sized openings 96 and 97. Within openings 96, 97 there is fixedly disposed a sleeve element 98 having a bore within which is disposed a retractable pin 99. The pin 99 is adapted to project inwardly through one of the two openings 90 when in registry with the opening 95.

The sleeve 98 is formed with an enlarged bore 100 provided with shoulder means 101 at its outer end and the pin 99 has a rod 102 secured thereto adapted to be moved outwardly of the bore 100 and being provided with shoulder means 103 intermediate the ends thereof. A spring 105 is biased between the shoulder means 101 and 103 to normally urge the rod 102 with the pin 99 thereon inwardly towards the apertures 90 and 95, and the pin and rod are adapted to be retracted to withdraw the pin from the apertures 90 and 95 by a tubular handle 106 slidably mounted on the outer end of the sleeve 98 and secured to the outer end of the rod 102.

As shown in FIGS. 17 and 18, the pin 99 is in its home or extended position within the openings 90 and 95 and is thus capable of reacting driving torque in either direction. In the event that the teeth of the rings 20 and 29 fail to mesh and it is required to rotate casing 24 to mesh the same, the pin 99 may then be biased against the imperforate wall portion of extension 88 between the two openings 90, when the handle 106 is released. Thus, upon application of driving torque annular member 63 with its extension 88 is rotated on its journal until one of the stops 91 is arrested by a side wall of member 93. At this time the pin 99 is in registry with one of the openings 90 and is urged by spring 105 to slide through that opening into the registered opening 95 in back wall 94 to lock the casing 24 to the torque reaction framework 25.

*The Satelliting Linkage*

As shown in FIGS. 2, 3, 19, 20, 21 and 22, the satelliting linkage D comprises a satelliting beam 107 pivotally mounted at its inner end at the front of the vehicle, an adjustable sustaining bar 108 attached at one end to the outer end of the satelliting beam 107 and at its other end to the vehicle rearwardly of the front thereof, and a pair of steering arms 109 fixedly connected at one end to aircraft landing gear structure and at the other end pivotally connected to the satelliting beam 107.

In order to couple the steering arms 109 to the aircraft, the landing gear structure between each pair of wheels is provided with a pair of steering lugs (not shown) suited to mate with a plate 110 (FIG. 2) having spaced shear pins 111 thereon, which shear pins 111 are provided to protect the aircraft landing gear from overload damage. The arms 109 have spaced apertures 112 at one end for receiving the pins 111 and have clamping arrangements 114 at the other ends adapted to cooperate with structure on the satelliting beam 107 to facilitate quick coupling and uncoupling thereof.

The clamping arrangement 114 (FIGS. 19-22) comprises a pair of clamping members 115 pivotally mounted at their inner ends by a bolt-nut arrangement 115' to the steering arm 109 and having structure with recessed jaws 116 at the free ends thereof adapted to cooperate with structure having an upstanding pin 117 (FIG. 22) on the satelliting beam 107 for seizure by the jaws 116 to provide pivotal engagement therebetween; and a pair of toggle actuating levers 118 rigidly connected, as by welding, to an arm assembly 119' (FIG. 21), which is rotatably mounted on the steering arm 109 by pin 119 and, in turn, connected by adjustable links 120 to the members 115 by pin 121, so that the free ends of the levers 118 can be manually operated to actuate the members 115 and, in turn, the jaws 116. Preferably, the members 115 are locked in their coupled position by a removable pin 122, as a safety precaution, the pin 122 being removed when the jaws 116 are to be spread apart, as when uncoupling the satelliting linkage D.

While the aircraft is being driven by the wheel movers, the position of the steering arms 109 can be changed to steer the aircraft, as by means of linear hydraulic motors 124, 125 and 126, each pivotally linked at one end to a steering arm 109 and at the other end to the satelliting beam 107 (FIG. 2).

*Hydraulic Power Plant*

Figure 23:
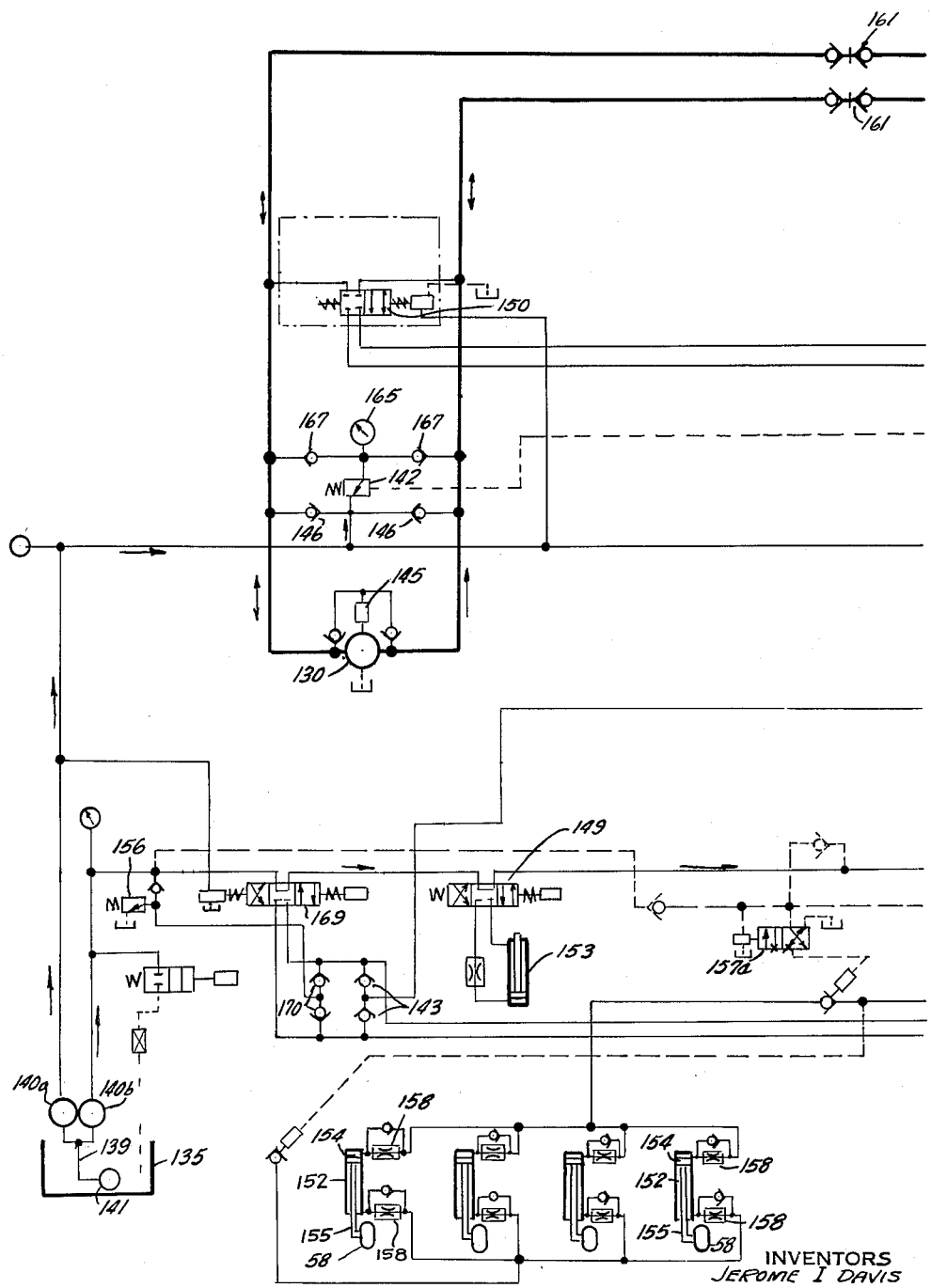

The hydraulic system is diagrammatically illustrated in FIGS. 23 and 23a. Generally described, the hydraulic system comprises two independently closed hydraulic loops each having four motors 26 connected therein, the motors in these views being designated 26a, 26b, 26c, and 26d, with motors 26a and 26b, and motors 26c and 26d being in the same loop, respectively. Each loop includes a primary axial piston type, variable displacement, reversible hydraulic pump 130 for driving the motors, a hot oil removal system 131, and valving 132 for cutting out the motors 26a, 26c in the loops.

Common to both loops is a heat exchanger 133 protected by a by-pass relief valve 134, an oil reservoir 135, a return line 136 connecting the outlet of the heat exchanger 133 to the reservoir 135, a filter 137 in the return line 136 protected by a by-pass check valve 138, an oil supply line 139 connecting the reservoir to supercharging pumps 140a and 140b and a strainer 141 in the supply line at the reservoir 135.

The primary pumps 130 utilize pressure relief valves 142 and the supercharging pump 140a has a relief valve 144 for controlling the maximum pressure. The pressure of the supercharging pump 140a is used to pressurize a servo 145 which controls the primary pump displacement. Oil from the pump 140a enters the closed loop circuit through check valves 146 and is pressure controlled by a relief valve 147 which has its inlet connected to valving 148 and 144 and has its outlet connected to the heat exchanger 133. This oil is used for replenishing oil lost in the closed loop due to case drains, etc., and enters the low pressure side of the primary pump 130 through check valves 146. Another component of the primary pumps is a "dead band" control, which by-passes all pumped fluid to the return side of the pump when the flow is one gallon per minute or less. This function is performed by two-way valves 150 having their spool positions dictated by automatic solenoid action when pumps 130 are in theoretically neutral position. This prevents pressure build-up in the closed loop if neutral pump position is not zeroed.

The hot oil removal system 131 includes a pilot operated four-way valve 148 which senses differential pressure between the two sides of the loop automatically, thus opening the return side of the loop to the reservoir 135 through the relief valve 147. This relief valve controls the pressure in the return side of the loop when oil is being removed from the system and is set somewhat lower than the valve 144.

A high speed arrangement is accomplished by cutting out two of the motors 26 in each loop, namely 26a and 26c, through the valve 132 which is pilot operated, by a solenoid controlled valve 151. The valve 132 is shown in the low speed range, that is, with both motors in each loop being driven. When the valve is shifted, the motors 26a and 26c become part of their own independent closed loops and then act as pumps, since they are geared to run with their mates which are still being driven by the pump 130, namely, 26b and 26d, respectively. Flow through the cut-out motors 26a and 26c can become rather high, thereby making it necessary to supercharge the respective loops with oil. The relief valve 147 controls the replenishing of oil and oil is admitted to the respective loops through the check valves 146.

The hydraulic system also powers the mechanism for lowering or extending the casters 58 to raise the vehicle main wheels 86 off the ground when the vehicle V is satellited to the aircraft, which mechanism includes cylinders 152, pistons 154 and piston rods 155. The piston rods are connected to the casters 58. Fluid for this system is supplied by one section of the dual pump 140b and its pressure is controlled by a relief valve 156. Electric solenoid controlled valves 157a and 157b control the direction of flow to the cylinders 152. A flow control valve 158 is provided in this line to insure equal flow to each cylinder 152 in either direction.

The two primary loops are also used for the vehicle drive circuit. A manual four-way valve 159, shown in aircraft drive position, is linked mechanically to a second four-way valve 160. These valves are shifted to drive the vehicle when the wheel movers are not connected to the aircraft and the ends of the loops are blocked by a shut-off feature embodied in conventional quick disconnect couplings 161. When these couplings 161 are disconnected, the only path for the loop to take is through the valve 159 to a hydraulic motor 162 which drives the vehicle.

The motor 162 is a fixed displacement vane type motor operable at pressures up to 2000 p.s.i., whereas the main hydraulic system relief valves are set at about 5000 p.s.i. It thus is necessary to reduce the system pressure in vehicle drive to the 2000 p.s.i. maximum. This reduction is accomplished by the valve 160 admitting oil to a remote control valve 163, since the valve 160, as aforementioned, is linked to the vehicle aircraft valve 159. Check valves 164 prevent interflow between the two relief valves 142 and insure individual maximum pressure control.

Pressure gauges 165 and 166 in conjunction with check valves 167 insure that pressure is sensed only on the high pressure side of the hydraulic system.

Steering of the aircraft is accomplished by linear hydraulic motors 124, 125, and 126 which are connected to the aircraft through linkage D, described hereinbefore (FIG. 2). The direction and locking of these motors 124, 125 and 126 are controlled by a four-way solenoid operated valve 169. Check valves 170 allow the high pressure side of the motors 124, 125 and 126 to be relieved of any pressures in excess of 1400 p.s.i. by the relief valve 156. Check valves 143 allow positive pressurized replenishing fluid to enter the low pressure side of motors 124, 125 and 126 during the periods of excessive high pressure dumping of fluid through the pressure relief valve 156.

The wheel mover unit storage system includes two four-way manual control valves 149 and cylinders 153. The cylinders 153 are connected to storage brackets by steel cables and provide the required force to lift the wheel mover unit in place. The pressurized flow to the cylinders 153 is controlled by manual movement of the control valves 149.

*Electrical Controls*

The flow of fluid from the two hydraulic pumps 130

Figure 24:
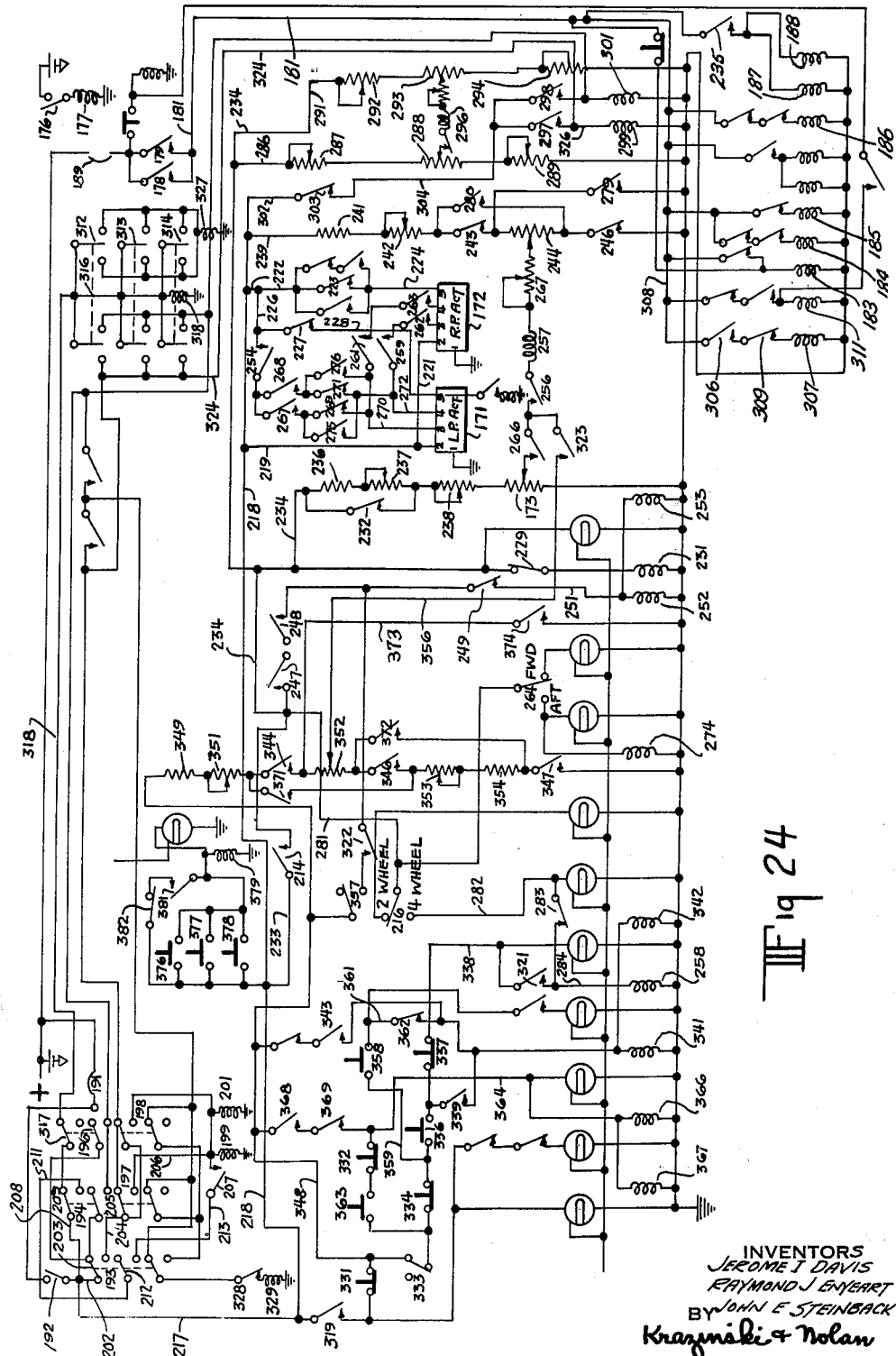
FIG. 24 is a schematic view of the electrical control circuit.

(FIGS. 23, 23a) to the four hydraulic drive motors 26 (26a, 26b, 26c, 26d), two motors on each drive assembly, is controlled by two electric actuators 171, 172 (FIG. 24), one for each pump, which actuators are supplied by electrical energy from the vehicle generator (not shown). Each pump actuator comprises a direct current motor (not shown), with two fields, one field for each direction of fluid movement. Each actuator is controlled independently of the other by a conventional Wheatstone bridge circuit, with a polarized relay as a null-seeking device.

There is shown a positioning potentiometer 173 for aircraft drive, which potentiometer is located in a remote control box 174 (FIG. 1) operated by a speed control lever (not shown) having reverse, neutral, first and second speed positions. The potentiometer 173 is of such value that the movement of the lever is of equal travel for first speed, second speed and reverse.

In the "neutral" and "maximum first speed" positions, detents (not shown) are provided for the speed control lever. By moving the lever into the "second speed" range switches are operated for de-energizing a solenoid valve that interrupts the flow of hydraulic fluid to one of the two hydraulic motors 26 on each aircraft wheel and changes the tuning of the Wheatstone bridge circuit in such manner that the actuators 171, 172 reduce the flow of hydraulic fluid to the remaining motors 26 in half.

For vehicle drive the positioning potentiometer 173 in the remote control box 174 for the left pump 130 is replaced by a reversible circuit with the potentiometer instead located in the cockpit of the vehicle and operated by an accelerator pedal. The reversing switch is located on the vehicle dashboard and is electrically interlocked, so that the direction of movement of the vehicle cannot be changed with the accelerator pedal depressed.

The electrical circuit (FIG. 24) will be readily understood from a detailed description of its operation, first for movement of the aircraft under control of the vehicle, and then for movement of the vehicle by itself. Assume that the wheel movers are connected to the aircraft wheels and it is desired to move the aircraft full straight ahead, that is, in a forward direction.

Main line or ignition switch 176 is first closed to energize main solenoid relay 177 which closes make contacts 178, 179 to supply positive potential over lead 181 for energizing hydraulic solenoid valves 183, 184, 185 and 186 via circuit breaker 189 and unswitched source of positive potential. The supply for the control circuitry is also fed from an unswitched positive potential source through a circuit breaker 191; but this control circuitry is protected by a serially disposed hydraulic pressure switch 192 to insure non-operation thereof until the two hydraulic pumps 130 are actuated.

With closing of the pressure switch 192 power is supplied to a gang type micro-switch 193 installed in such a position as to be operated by forward or reverse movement of the aircraft vehicle hydraulic valve manual lever (not shown). With the vehicle supported by its casters 58, that is, with the casters 58 in a lowered position on the ground, and the vehicle aircraft lever moved to "Aircraft" position, microswitches 193, 194, 196, 197, and 198 are moved to their operated positions.

Accordingly, aircraft control relays 199 and 201 operate in a circuit that can be traced from positive battery on pressure switch 192 over lead 202, operated contact 203 of micro-switch 193, lead 204, operated contact 205 of micro-switch 197, lead 206 and thence in parallel through the windings of relays 199 and 201 to ground. Relay 201 in operating closes its make contact 207 and thereby provides a locking circuit for both relays 199 and 201, which circuit can be traced from pressure switch 192 over lead 208, operated contact 209 of micro-switch 194, lead 211, operated contact 212 of micro-switch 193 and lead 213 through operated contact 207 and windings of relays 199 and 201 to ground. Relay 201 in operating also closes its make contact 214 which thereby insures positive battery supply to the aircraft drive control circuits, aircraft steering and "2-wheel" or "4-wheel" switch 216. By "2-wheel" is meant attachment of the wheel mover units to two aircraft wheels, whereas by "4-wheel" is meant attachment of the wheel mover units to four aircraft wheels, as shown in FIG. 2.

With the remote control box 174 connected to a reeled cable on the vehicle V, the aircraft is moved and steered from the controls on the box 174. The electric supply for the hydraulic pump actuators 171 and 172 is furnished directly from pressure switch 192 over leads 217, 218 and thence in parallel, one branch over leads 219 and 221 to terminals 2 of both actuators; another branch over lead 222, closed contact 223 of stop release relay and lead 224 to terminal 5 of the right pump actuator 172, and still another path over lead 226, closed contact 227 of stop release relay and lead 228 to terminal 5 of the left pump actuator 171.

Aircraft speed selector switch 229 is closed when the control lever is in the neutral position. Accordingly, speed control relay 231 operates in an obvious circuit to open its contact 232 and close its contact 235 to energize solenoids 187, 188. Upon closing of contact 214 of relay 201 the Wheatstone bridge circuits (aircraft speed and steering) are energized. The aircraft speed circuit may be traced from lead 218 over lead 233 closed contact 214, lead 234, resistors 236, 237, 238 and thence through positioning potentiometer 173 to ground for one side of the Wheatstone bridge; the other side of the Wheatstone bridge being supplied directly from lead 218 through lead 239, resistors 241 and 242, closed contact 243, follow-up potentiometer 244 and thence over closed contact 246 to ground.

With the control lever still in the "Neutral" position, stop detent switch 247 is in the open position, thereby retaining stop release relay contacts 227 and 223 in their closed positions and thus supplying the neutral finding circuit (terminals 5) of the actuators 171, 172 and cutting off fluid supply to the hydraulic system. In moving the control lever forward from its "Neutral" position, switch 247 closes and, since contact 248 of operated relay 201 has already been closed, positive potential is fed over normally closed emergency stop relay contact 249 and lead 251 through windings of stop release relay 252 and actuator separating relay 253, in parallel, to ground. Relay 252 in operating closes its contact 254 and opens its contacts 223 and 227 to remove positive potential from terminals 5 of both actuators 171, 172. Relay 252 also closes its contacts 256 in the bridge circuit to thereby enable the polarized pump control relay 257 to control the position of the servo actuator 145 (FIG. 23). Since the wheel drive selector 216 is in the "2-wheel" position, vehicle drive relay 258 is de-energized and thus its contacts 259 and 261 remain open. Consequently, closure of contacts 262, 263 of relay 253 has no effect at this time.

Positioning potentiometer 173 is divided into three sections of equal resistance, the center of the first two divisions being neutral and the third division being for first speed. On such forward movement of the control lever the second section creates an unbalanced condition in the Wheatstone bridge circuit, and with landing gear selector switch 264 in the FWD position, the null-finding circuit of the Wheatstone bridge is closed, as can be traced over resistors 236, 237, 238, potentiometer 173, closed contact 266 of relay 201, closed contact 256 of stop release relay 252, polarized relay 257, resistor 267, potentiometer 244, closed contact 243, resistors 242 and 241 and thence over leads 239, 218 and 233, closed contact 214 and lead 234 back to resistor 236. Polarized relay 257, in view of the passage of current through its winding, operates and closes its contacts 267, 268 to furnish positive potential to the left pump actuator 171 in a circuit that can be traced from lead 218 over leads 222 and 226, closed contact 254 and in two parallel paths, one path via closed contacts 267 and 269 and lead 270 to terminal 3, and the other path via closed contacts 268 and 271 and lead 272 to terminal 4 of actuator 171. The left pump actuator 171 will then move until follow-up potentiometer 244 re-establishes the balance in the Wheatstone bridge circuit, whereupon relay 257 releases to remove battery from terminals 3 and 4 of the actuator, thereby controlling the servo actuator 145 and, in turn, flow of hydraulic fluid.

The control lever can be advanced up to the detent before the high speed portion of the positioning potentiometer 173. On entry of the high speed portion, speed selector switch 229 opens and releases speed control relay 231, which recloses its contact 232 to unbalance the Wheatstone bridge by short circuiting resistors 236 and 237. As a result, the preceding action of relay 257 is repeated and the left actuator 171 moves to half-flow position as the followup potentiometer 244 moves to rebalance the Wheatstone bridge circuit. Relay 231 in releasing also opens its contact 235 to de-energize speed control solenoids 187, 188. Release of these solenoids cuts off the supply of fluid to two motors, one on each wheel mover. As the control lever is moved further forward into the high speed position, the actuator 171 moves up in sympathy from half-flow position to full flow position in relation to lever movement.

Reversal of movement is accomplished with the same circuit but using the first division of potentiometer 173 which tends to move the actuator rotation in such a direction as to adjust the flow servo in the reverse quadrant.

The vehicle is designed so that it may be attached to the aircraft under carriage either to the forward or aft landing gear. If attached to the aft landing gear, it is required that the speed controls be reversed. Such a selection is made by moving the switch 264 from the FWD position to the AFT position. In this latter position a circuit for operating relay 274 is closed, whereby its contacts 275 and 276 close and its contacts 269 and 271 open to reverse the action of the contacts 267 and 268 of polarized relay 257. Also, by closing contacts 279 and 280 and opening contacts 246 and 248 of relay 274 the polarity of the voltage applied to the pump control follow-up potentiometer 244 is reversed, thereby causing this potentiometer to reverse its action and to allow for the reverse rotation of the left actuator 171 required in the AFT position.

For 4-wheel drive the switch 216 is shifted from the "2-wheel" position shown on the drawing to the "4-wheel" position, thereby energizing vehicle drive relay 258 in a circuit that can be traced from lead 218 over lead 233, closed contact 214, lead 281, switch contact 216, lead 282 and thence over closed contact 283 and lead 284 through winding of relay 258 to ground. Relay 258 in operating closes contacts 259, 261 to thereby also connect the right pump actuator 172 into circuit and thus provide both actuators 171, 172 in circuit, so that hydraulic fluid is supplied to both sets of wheel movers. Control circuitry is similar to that described for "2-wheel" drive.

For aircraft steering, a Wheatstone bridge circuit is also used, the circuit being traced from lead 234 for one side through lead 286, resistor 287, potentiometer 288 and resistor 289 to ground; while the other side is over lead 291, resistor 292, potentiometer 293 and resistor 294 to ground. Potentiometer 288 is located in the remote control box 174 while the follow-up potentiometer 293 is located on the satelliting beam 107 attached to the aircraft undercarriage, as described hereinbefore. Steering is accomplished by actuation of the hydraulic motors 124, 125 and 126, steering control relay (polarized) 296 sensing an out-of-balance condition when potentiometer 288 is moved from its central position to thereby operate and close its left contact 297 or its right contact 298, depending upon whether the potentiometer slide is moved to the left or right, and correspondingly energizing either the left steering relay 299 or the right steering relay 301.

Assuming that the left steering relay 299 has been energized, its circuit can be traced from lead 218 over lead 302, closed contact 303, lead 304, closed contact 297 of relay 296, lead 326 and thence through winding of relay 299 to ground. Relay 299 in operating closes its contact 306 and thus energizes left steering solenoid 307 in a circuit that can be traced from battery on lead 181 over lead 308, closed contact 306, closed contact 309 and thence through winding of solenoid 307 to ground. Solenoid 307 operates to open its valve and thereby supplies hydraulic pressure to the steering motors 124, 125, 126 to turn the undercarriage wheels for a left turn. The steering arm moves in relation to the satelliting beam 107 until follow-up potentiometer 293, located across the angle of movement, has moved sufficiently to balance the Wheatstone bridge circuit, as is readily understood. For a right turn the circuit description is analogous in that right steering relay 301 is operated to close right steering solenoid 311.

Assume next that the vehicle is resting on its own wheels with the casters 58 raised. Also assume that it is desired to gradually move or "inch" the wheel mover units so as to facilitate their connection to the aircraft wheels. In this respect three interconnected switches 312, 313 and 314 are located on the satelliting beam 107, power being supplied to a center bus 316 thereof from pressure switch 192 via lead 208, closed contact 209 of micro-switch 194, closed contact 317 of micro-switch 196, lead 318 and thence over bus 316 through winding of vehicle control relay 318 to ground. Relay 318 in operating closes its contacts 319, 321, 322 and 323 and opens its contact 283.

On manual operation of one of the switches 312, 313 or 314, say to the left, positive battery potential is connected to left steering control relay 299 in a circuit that can be traced from bus 316 of these switches over leads 324 and 326 through winding of relay 299 to ground. Pressure relief solenoid relay 327 is also energized in an obvious circuit from bus 316, whereby contact 328 is opened to prevent operation of relay 329 and thus in turn interplay between the hydraulic motors of the casters 58 and the inching control. Upon operation of relay 299, its contact 306 closes to operate left steering solenoid 307, whereupon the steering motors retract and move the steering arms to a desired position to facilitate attachment to the aircraft undercarriage. The circuit for operation of the switches 312, 313, 314 to the right is substantially the same except that the right steering relay 301 operates and this relay, in turn, causes operation of right steering solenoid 311 which extends the piston rods of the motors 124, 125, 126 for a movement to the right.

For vehicle operation with the hydraulic pumps 130 operated, pressure switch 192 is in the closed position and vehicle control relay 318 is energized through a circuit already traced. Accordingly, in the "Neutral" position, using a push-button drive system mounted on a panel before the operator of the vehicle and with the "Neutral" button 331 in the retracted, closed position as shown, positive battery potential is supplied to the neutral finding circuits of both actuators 171, 172 via closed contacts 223 and 227, as traced hereinbefore, so as to retain the pumps in the "no flow" condition.

For moving the vehicle on the ground, "Drive" button 332 is operated, whereupon vehicle drive relay 258 operates in a circuit that can be traced from closed pressure switch 192 over lead 217, closed contact 319, closed neutral button contact 331, closed accelerator pedal contact 333, closed button contacts 334, 336 and 337 and thence over lead 338, closed contact 321 and lead 284 through winding of relay 258 to ground. Relay 258 in operating closes its contact 339 which closes an obvious operating circuit for low relays 341 and 342. Low relay 341 in operating closes its contact 343 to provide a locking circuit for both relays 341 and 342, as well as a locking circuit for relay 258 via closed contact 339. Low relay 342 in operating closes its contacts 344, 346 and 347 to set up one leg of a Wheatstone bridge circuit, which leg may be traced from positive potential on closed button contact 331 over lead 348, resistors 348 and 351, closed contact 344, potentiometer 352, which is located in the accelerator box of the vehicle and the resistance of which is varied by movement of the accelerator pedal, and thence over closed contact 346, resistors 353 and 354, and closed contact 347 to ground. Since relay 318 has operated to close its contact 323, this contact 323 connects the above traced leg of the Wheatstone bridge to the other leg thereof. Consequently, as the accelerator pedal is depressed to vary the resistance of potentiometer 352, it unbalances the bridge circuit to thereby energize polar relay 257. This circuit can be traced from resistors 349 and 351, through closed contact 344, potentiometer 352, lead 356, closed contacts 323 and 256, polar relay 257, resistor 267, potentiometer 244, closed contact 243, resistors 242 and 241, leads 239, 218 and 217, closed contact 319, closed button contact 331, and lead 348 back to resistor 349. In the above traced circuit contact 256 of relay 252 was closed. As a result of movement of the accelerator pedal which closed contact 357 to energize relays 252 and 253 in a circuit that can be traced from battery potential on lead 348 through closed contacts 357, 322 and 249, lead 251 and thence through parallel windings of relays 252 and 253 to ground. Movement of the accelerator pedal also opens contact 333 but relay 258 remains operated in view of its holding circuit over contacts 339 and 343. Since relays 252, 253 and 258 are operated, contacts 262 and 263 of relay 252 are closed; contacts 254, 259 and 261 of relay 258 are also closed to provide battery supply to terminals 3 and 4 of both actuators 171 and 172 in the manner already traced hereinbefore. Contacts 223 and 227 of relay 252 respectively open the circuits to terminals 5 of both actuators and thereby open the respective finding circuits thereof. In view of the operation of both actuators the hydraulic flow controlled thereby rotates the hydraulic motor 162 (FIG. 23a) on the vehicle which causes the vehicle to move in a forward direction, the speed thereof increasing with the depression of the accelerator pedal. To return to a neutral condition, the operator merely depresses the neutral button 331 which opens the battery supply to the above traced circuit and thus releases the mechanisms controlled thereby.

For low speed operation of the vehicle, the low button 358 is depressed and with the accelerator pedal in the normal retracted position the circuit can be traced as follows: from battery on neutral button contact 331 through closed contacts 333, 334, lead 359, closed low button contact 358, lead 361, closed contact 362 and thence through windings of relays 341 and 342 to ground. Relay 341 in operating closes its contact 343 and, as before, locks in both relays 341 and 342. Since relay 258 is not energized, the right pump actuator 172 is retained in its neutral position while the left pump actuator 171 is controlled by the same circuit traced hereinbefore with respect to the "Drive" position, thereby reducing the hydraulic fluid flow by one-half and giving a reduced speed range response to the accelerator pedal.

For driving the vehicle in reverse, the accelerator pedal must be returned to its normal retracted position, so that accelerator pedal 333 contact is closed, thus preventing any sudden change. Accordingly, upon depression of the reverse button 363 the operative circuit is as follows: from battery on contact 333 through closed reverse button contact 363, closed button contact 332 and thence over lead 364 through parallel windings of relays 366 and 367 to ground. Relay 366 in operating closes its contact 368 to provide a locking circuit for relays 366 and 367 via closed contact 369 and lead 364. Battery potential is supplied through closed neutral button contact 331 to the Wheatstone bridge system; but as relay 342 is not energized, operated closed contact 371 of relay 366 conveys the battery supply from resistor 351 to the original negative side of potentiometer 352 via resistors 353 and 354, closed contact 372 to the lower side of potentiometer 352, lead 373 connecting the upper side of potentiometer 352 to ground over closed contact 374 of relay 366, thereby reversing the polarity of the voltage impressed across potentiometer 352. This reversal has the effect of reversing the operation of the Wheatstone bridge system, so that the left actuator 171 operates in the lower half of the flow servo, thereby reversing the hydraulic pump flow and consequently the vehicle drive motor.

In an emergency, stop buttons 376, 377, 378 are located on both side and rear panels of the vehicle in order to provide readily accessible means for bringing the vehicle to a stop, if required. By depressing any one of these three push buttons emergency stop relay 379 is energized in an obvious circuit and this relay in operating closes a locking circuit therefor through closure of its contact 381. Relay 379 in operating also opens its contact 249 to release relays 252 and 253, the latter relay of which opens contact 254 and closes contacts 223 and 227 to thus feed the neutral finding circuit contacts 5 of both actuators to thereby shut off fluid flow. Resetting of the system is accomplished by opening switch 382, whereby relay 379 is released.

*Operation*

The vehicle V carrying the complete wheel mover system is first driven to a position adjacent the aircraft fuselage just short of the required attachment position. A ground crew assisted by suitable mechanism on the vehicle then lowers the two sets of pairs of wheel movers from the vehicle onto the ground and rolls them on their own rollers 78 and casters 80 to a position where they are astride the aircraft wheels, preferably one set of wheel movers to the front and the other set of wheel movers to the rear (aft) of the wheels (FIG. 2).

The framework 25 for supporting the casings 24 of the wheel movers is so constituted that the arms 61 supporting the casings 24 thereof may be swung outwardly with respect to the cross bar 66 (FIG. 4a) and, since the rings 29 must be parallel with the rings 20 of the aircraft wheels, the casings 24 must correspondingly be swung inwardly to compensate for the outward movement of the arms 61. Referring to FIG. 4a, the ground crew moves each casing 24 outwardly until arm 61 is displaced about 10°, at which point a pin 385 is dropped into an opening in a telescopic rod-cylinder member 386 to abut the end of a rod 387; similarly each casing 24 is swung back the same amount, about 10°, and a pin 388 dropped into an opening in another telescopic rod-cylinder member 389 to abut the end of a rod 391. Both pins 385 and 388 maintain the arms 61 and casings 24 in the above adjusted positions. It might be mentioned at this point that each casing 24 is mounted on a self-aligning pivot 392 (FIGS. 4c, 4d), which pivot 392 is common to both pivots 64 and 89, so that the casing 24 may be rotated about an axis extending through pivots 64 and 89. The links 67 (FIG. 4a) are also spread apart to widen the distance between pins 57 by rotating the handle 38 to move the bolt 73 to the right, as viewed in FIG. 4b. In addition, a pin 393 is kept in position for maintaining arm 83 fixedly secured to arm 74 (FIG. 4).

The crew then raises cross bar 66 of each wheel mover, so as to place links 67 with their pins 57 near apertured lugs 22 of the aircraft carriage structure C. When in registry, the pins 57 are inserted into the openings of the lugs 22 to provide reaction points and the handle 38 is rotated to lock them in place. The crew, while holding cross bar 66 in position with rollers 80 on the ground, operate crank handles 84 to raise the casings 24, using lugs 22 and pins 57 as lifting fulcrums (reaction points), until the casings 24 are approximately in attachment position (FIG. 10), after which the pins 385 and 388 (FIG. 4a) are removed from both telescopic members 386 and 389, respectively, to permit the casings 24 to be moved inwardly toward the aircraft wheel for ring engagement. To allow self-aligning freedom for each casing 24 about a horizontal axis a pivot 395 for arm 386 is supplied.

To limit this freedom to approximately ±5° the arm 386 has widely spaced, adjustable stops 396 which engage with mating stops 397 on V-shaped fitting 62 (FIG. 4e).

The indexing step for mesh engagement of the ring teeth is next performed by withdrawing the handle 106 (FIG. 17) beyond the tube 98 and rotating it 45° to lock it in the retracted position, whereby the pin 99 is removed from the openings 90 and 95 to permit each casing 24 to rotate a certain amount. The clamp handle 54 (FIG. 5) is then placed in its neutral position, so that the clamps 47 will be in a position to automatically latch when the teeth of both rings 20 and 29 become engaged; and the casings 24 are then adjusted by movement of crank 84 until each casing is centered on its associated wheel axis (FIG. 11).

The casings 24 are next urged inwardly by the crew until the rings abut, after which they are rotated until the teeth of rings 20 and 29 are indexed. This will allow full engagement of the rings 20 and 29 at which time the clamps 47 latch onto rings 20. The handle 54 is then moved to the closed position to thereby lock the latches 47 in position and thus insure that all latches 47 are in final position. Assume that the pin 99 of any unit is not in alignment with either of the openings 90 and the indexing handle 106 is returned to its original position to urge pin 99 against extension 88. Accordingly, when driving torque is applied to the aircraft wheels, the casings 24 are rotated (since there is no reaction point at this moment) until the stops 91 hit associated sides of the members 93, whereupon one of the holes 90 for each casing 24 registers with associated opening 95 to enable the associated pin 99 to penetrate therethrough and lock the torque reaction system. The cranks 84 are then rotated backward to unload both the screws 82 and the pins 393, after which the pins 393 are removed from arms 74 and 83 to provide a loose connection between nut 81 and arm 74 and thereby permit relative angular motion about pivot 76 between arm 67 and framework 25. This loose connection permits landing gear spring action without overloading the screw 82.

With the casings 24 mounted on the aircraft wheels, the ground crew next removes the steering members from racks on the vehicle and mount one end of each, that is, plate 110, to existing aircraft steering lugs on landing gear axles, through appropriate quick disconnecting linkages (FIG. 2). The satelliting beam 107 is then swung into a position substantially perpendicular to the longitudinal axis of the vehicle, from storage on the vehicle, while the steering cylinders 124, 125, and 126 remain stowed on the satelliting beam 107. Link 394 which depends from aft tube 66 (FIG. 3) is next pinned to the steering arm 109 to hold it above the ground, after which the vehicle V is inched forward until the toggle-type clamping devices 114 (FIG. 19) are engaged to the satelliting beam 107. The steering cylinders 124, 125, and 126 are then swung out and through use of respective micro switches 312, 313, 314 the respective piston rods are extended and connected to the steering arms 109. Adjustable drag brace 108 is also connected to the satelliting beam 107.

The hydraulic system pressure is then dropped to zero, after which by quick disconnects 161 the hydraulic system is connected to the wheel movers. The hydraulic system is then reactivated and the vehicle casters 58 extended to raise the vehicle wheels 86 above the ground. This completes the connection and effectively satellites the vehicle to the aircraft during movement thereof.

The remote control box 174 is removed from storage on the vehicle and interconnecting electrical control cable paid out as desired to permit the operator to move the aircraft therefrom in accordance with the electrical control procedure described hereinbefore. For disconnection, the foregoing procedure is reversed.

*Conclusion*

From the foregoing description, it will be seen that the present invention provides a wheel mover system which is arranged to power two or four adjacent wheels of the aircraft and thereby is effective to drive extremely heavy aircraft which prior wheel movers could not handle. The system is capable of propelling the aircraft at a speed of better than five miles an hour, can move the aircraft up a 2% incline and has good acceleration. All this is accomplished in a relatively simple, practical and economical manner.

While the system and its components have been described in connection with powering extremely heavy aircraft, it will be appreciated that certain features of construction and arrangement thereof can be utilized advantageously to power lighter aircraft having only one pair of axially aligned wheels. This is readily accomplished by using one wheel mover unit including two wheel movers and the torque reaction arm connection therebetween.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In apparatus for ground handling of aircraft, the combination of a bar, a link having one end secured to said bar and its other end having means for attaching the same to landing gear wheel supporting structure of the aircraft, a lever rigidly mounted on said bar and having two arms, a wheel mover unit including a casing and driven means adapted for driving connection to an aircraft wheel, a frame including a pair of arms interconnected at one of their ends and at their other ends adjustably connected to said casing, said frame being pivotally mounted on one of said lever arms adjacent the interconnected ends of said pair of arms, and means interconnecting said other lever arm and one of said frame arms for positioning said driven means with respect to the aircraft wheel.

2. Apparatus according to claim 1, wherein said last mentioned means include a rod journalled to said frame arm for rotation and threaded through said other lever arm, and means for manually rotating said rod.

3. Apparatus according to claim 1, wherein said frame has wheels and casters for supporting the wheel mover unit on the ground.

4. Apparatus according to claim 3, wherein a wheel is beneath said casing and a caster is beneath the connected ends of said frame arms.

5. Apparatus according to claim 1, wherein said driven means are adapted to mesh with means on the aircraft wheel, said frame arms at their other ends are universally connected to an annular member journalled to said casing, and said casing and said frame arms have indexing means for permitting rotation of said casing and the driven means attached thereto a predetermined distance in either direction with respect to said wheel means to mesh the same.

6. Apparatus according to claim 5, wherein said indexing means include a retractable pin on said casing, an extension on said annular member having a pair of spaced apertures therein through which said pin is adapted to extend, and structure on said casing having an aperture in alignment with said pin for receiving said pin when the same extends through one of said spaced apertures.

7. Apparatus according to claim 6, wherein said driven means and the aircraft wheel include rings having teeth adapted to mesh and said pair of apertures are spaced apart a distance to enable said casing to be rotatably shifted with respect to the aircraft wheel a distance about equivalent to one-half the width of a tooth on said driven means.

8. Apparatus according to claim 6, wherein said retractable pin is provided with a handle and a spring for urging the same towards said spaced apertures, whereby when one of said spaced apertures is in alignment with said casing structure aperture said pin is moved into said aligned apertures.

9. Apparatus according to claim 1, wherein said link and said frame are dimensioned to move the center of said driven means through an arc passing through the center of the aircraft wheel when said link is attached to the wheel supporting structure to thereby align the centers of said driven means and the aircraft wheel.

10. In apparatus for the ground handling of aircraft the combination of a bar, a link having one end pivotally secured to said bar and its other end having means for pivotally attaching the same to aircraft landing gear wheel supporting structure, a wheel mover unit including a casing and driven means adapted for driving connection to the aircraft wheel, a frame including a pair of arms interconnected at one of their ends and having their other ends universally attached to said casing, and means for universally connecting said frame to said bar adjacent the interconnected frame arms, said link and said frame being dimensioned to move the center of said driven means through an arc passing through the center of the aircraft wheel when said link is attached to the wheel supporting structure to thereby align the centers of said driven means and the aircraft wheel.

11. Apparatus according to claim 10, including a first frame supporting caster beneath said interconnected frame arm ends and a roller beneath said casing, whereby said unit can be wheeled on the ground to a position adjacent the aircraft wheel and said caster serves as a support while raising the apparatus to attach said link to the aircraft wheel supporting structure.

12. In combination, aircraft having landing gear including a wheel and structure for supporting said wheel formed with connecting means adjacent one side of said wheel, a bar, a link having one end universally secured to said bar and its other end having means for pivotally connecting the same to said supporting structure connecting means, a frame connected to said bar and positioned adjacent the opposite side of said wheel, a wheel mover unit supported by said frame, and cooperating means on said wheel and said unit for establishing a driving connection therebetween.

13. In combination, aircraft having main landing gear including a pair of axially aligned and spaced apart wheels each provided at opposite faces with means adapted to be driven and a common support for said wheels including structure between said wheels, a pair of wheel mover units each having means for engaging and driving said wheel means, a frame structurally interconnecting said wheel mover units, and a pair of links pivotally mounted on said frame, said structure between said wheels and said links having interengaging means thereon for attaching said links to said structure.

14. Aircraft according to claim 13, including means for releasably securing said links against movement to lock said interengaging means.

15. Aircraft according to claim 13, wherein said interengaging means include a pin at the free end of each of said links and a pair of aligned openings on said structure for receiving said pins.

16. Aircraft according to claim 15, wherein said pins face each other and said links have interengaging means thereon for moving said links towards each other to position and lock said pins in said openings.

17. In apparatus for ground handling of aircraft having a pair of adjacent axially aligned landing gear wheels, the combination of a bar, link means on said bar having means for pivotally attaching the same to aircraft structure, a pair of wheel mover units each including a casing and driven means adapted for driving connection to an aircraft wheel at opposite sides of the pair of wheels, a frame including a pair of arms for each of said casings, means for universally connecting said frames adjacent the respective ends of said bar, adjustable means between said bar and each pair of said frame arms for swinging said frame laterally, and adjustable means between each pair of said frame arms and each of said casings for swinging said casings inwardly.

18. Apparatus according to claim 17, wherein each of said adjustable means is constituted by a telescopic rod-cylinder member.

19. Apparatus according to claim 18, wherein each of said first adjustable means is pivotally connected to its associated frame arm.

20. Apparatus according to claim 19, wherein said pivotal connection for said first adjustable means comprises a three pronged arm extending from said telescopic member in which its central prong is pivotally connected to the frame arm and in which its two spaced prongs have adjustable stops adapted to bear against the frame arm and thereby provide a predetermined amount of free movement for each casing about a horizontal axis.

21. Apparatus for the ground handling of aircraft including main landing gear having two spaced apart pairs of axially aligned wheels, said apparatus comprising two pairs of structurally connected wheel mover units for rotating said wheels, means for coupling each wheel mover unit to one of the wheels, a mobile unit for supplying power to said wheel mover units, means interconnecting said mobile unit and said aircraft landing gear for permitting said mobile unit to satellite said aircraft while being driven by said wheel mover units, said satelliting means comprising a satelliting beam pivotally connected at one end adjacent the mobile unit, a sustaining bar interconnecting the satelliting beam adjacent its other end and the mobile unit, and a pair of spaced steering arms each of which is connected at one end to the aircraft landing gear and the other end to the satelliting beam.

22. Apparatus according to claim 21, wherein the connection between each of said steering arms and the satelliting beam is constituted by a toggle-type clamping member.

23. Apparatus according to claim 21, including a plurality of hydraulic motors interconnecting said steering arms and said satelliting beam for actuating said steering arms to turn said aircraft wheels in a desired direction.

24. Apparatus according to claim 23, wherein two of said hydraulic motors straddle one of said steering arms.

25. Apparatus according to claim 24, including hydraulic power provided by said mobile unit and switch means on said satelliting beam for actuating said hydraulic motors.

References Cited in the file of this patent

UNITED STATES PATENTS

| | | |
|---|---|---|
| 2,391,503 | Page | Dec. 25, 1945 |
| 2,409,552 | Donnellan | Oct. 15, 1946 |
| 2,539,010 | Cox | Jan. 23, 1951 |
| 2,869,662 | Koup | Jan. 20, 1959 |
| 2,966,222 | Lambert | Dec. 27, 1960 |
| 2,987,133 | Clifton | June 6, 1961 |